US010428842B2

(12) United States Patent
Hutchison et al.

(10) Patent No.: US 10,428,842 B2
(45) Date of Patent: Oct. 1, 2019

(54) PNEUMATIC ACTUATION SYSTEMS HAVING IMPROVED FEEDBACK CONTROL

(71) Applicant: Aurora Flight Sciences Corporation, Manassas, VA (US)

(72) Inventors: Matthew G. Hutchison, Manassas, VA (US); William Bosworth, Manassas, VA (US); Andrew Kehlenbeck, Manassas, VA (US); Devin Jensen, Manassas, VA (US)

(73) Assignee: Aurora Flight Sciences Corporation, Manassas, VA (US)

(*) Notice: Subject to any disclaimer, the term of this patent is extended or adjusted under 35 U.S.C. 154(b) by 207 days.

(21) Appl. No.: 15/588,178

(22) Filed: May 5, 2017

(65) Prior Publication Data
US 2018/0340554 A1 Nov. 29, 2018

(51) Int. Cl.
*F15B 9/09* (2006.01)
*B64C 13/42* (2006.01)
(Continued)

(52) U.S. Cl.
CPC .............. *F15B 9/09* (2013.01); *B64C 13/42* (2013.01); *B64C 13/48* (2013.01); *F15B 13/02* (2013.01);
(Continued)

(58) Field of Classification Search
CPC .. F15B 9/09; F15B 9/10; F15B 20/004; F15B 20/00
(Continued)

(56) References Cited

U.S. PATENT DOCUMENTS 3,747,350 A 7/1973 West et al.
4,527,954 A 7/1985 Murali et al.
(Continued)

FOREIGN PATENT DOCUMENTS

EP 2626302 A1 8/2013

OTHER PUBLICATIONS

Ilchnnann, A., Sawodny, O., & Trenn, S. (2006). Pneumatic cylinders: Modelling and feedback force-control. International Journal of Control, 79(6), 650-661.*
(Continued)

*Primary Examiner* — Michael Leslie
*Assistant Examiner* — Daniel S Collins
(74) *Attorney, Agent, or Firm* — Michael Stanley Tomsa; McAndrews, Held & Malloy, Ltd.; Eugene H. Nahm

(57) ABSTRACT

A triplex pneumatic architecture system is disclosed having first, second, and third pneumatic subsystems where triplex redundancy may be accomplished by measuring only one particular node in each system, such as a measured current of the servo valve. Each of the first, second, and third pneumatic subsystems are configured to control a separate redundant pneumatic actuation assembly. Each subsystem may comprise a current sensor to measure a control current from a servo driver to a servo valve that controls the pneumatic actuation assembly to output a measured current value, and a dump valve coupled to a relay. Each processor is configured to generate a termination signal to actuate the first relay to open the first dump valve. The triplex pneumatic architecture system further includes a communication bus to communicatively couple each of the first, second, and third pneumatic subsystems. Each processor is configured to generate the termination signal and to communicate the termination signal to one or more of the relays when one measured current value deviates from the two other measured current values by a predetermined error value.

22 Claims, 14 Drawing Sheets

(51) Int. Cl.
| | |
|---|---|
| *F15B 18/00* | (2006.01) |
| *F15B 19/00* | (2006.01) |
| *F15B 20/00* | (2006.01) |
| *F15B 21/08* | (2006.01) |
| *B64C 13/48* | (2006.01) |
| *F15B 13/02* | (2006.01) |
| *F15B 13/16* | (2006.01) |
| *F15B 21/044* | (2019.01) |

(52) U.S. Cl.
CPC .............. *F15B 13/16* (2013.01); *F15B 18/00* (2013.01); *F15B 19/005* (2013.01); *F15B 20/00* (2013.01); *F15B 21/044* (2013.01); *F15B 21/085* (2013.01)

(58) Field of Classification Search
USPC .................................................... 60/459, 406
See application file for complete search history.

(56) References Cited

U.S. PATENT DOCUMENTS 5,806,805 A * 9/1998 Elbert ..................... B64C 13/42
244/195
2015/0021441 A1 1/2015 Matsui

OTHER PUBLICATIONS

European Search Report for European Patent Application No. 18170951.0 dated Oct. 18, 2018.

\* cited by examiner

PNEUMATIC ACTUATION SYSTEMS HAVING IMPROVED FEEDBACK CONTROL

STATEMENT OF GOVERNMENT INTEREST

This invention was made with government support under Contract Number: HR0011-15-0027 awarded by the Defense Advanced Research Projects Agency (DARPA). The government has certain rights in the invention.

TECHNICAL FIELD

The present invention relates to a pneumatic actuation system, more particularly, to a triplex architecture for pneumatic actuation systems employing feedback compensation techniques.

BACKGROUND

Pneumatic actuation systems, which generally comprise a piston controlled by one or more pressure-control valves, are used in certain industrial applications. Recently, Aurora Flight Sciences Corporation ("Aurora") of Manassas, Va. incorporated pneumatic actuation systems into aircraft control systems. For example, Aurora recently developed a right-seat pilot assistant capable of operating an aircraft during takeoff, cruise, and landing using pneumatic actuation to manipulate primary flight controls. Despite mechanical simplicity, the dynamics of pneumatic actuation systems are intrinsically non-linear because of the switching nature of pressure-control valves and non-linear nature of the airflow that governs pressure change in the cylinder itself.

Conventional pneumatic actuation system controller design methods can be categorized into two general categories. The first design method employs a standard proportional integral derivative (PID) control architecture in which the gains are chosen experimentally. That is, there is little use of the extensive control theory available for robust design of the controller. The primary feedback signal on which the control compensator operates is the position error, which is defined as the difference between the commanded and actual position of the piston. A second design method employs complex non-linear methods, such as sliding-mode control. In these implementations, some signals are used for system feedback, but the gain-selection or control-design process is still based largely on heuristics and/or experimentation, which can be expensive, inaccurate, and overly complicated.

It is often advantageous to employ redundancy techniques such that a fault of one actuator will have only a nominal effect on the overall system. Such redundancy typically involves the duplication of critical components or functions of a system with the intention of increasing reliability of the system, usually in the form of a backup or fail-safe, or to improve actual system performance. In aerospace applications, for example, safety-critical systems (e.g., fly-by-wire, hydraulic systems in aircraft, flight control systems, etc.) may be triplicated. In a triplex-redundant (aka, triply redundant) system, the system has three subcomponents, all three of which must fail before the overall system fails. Since each subcomponent rarely fails, and because the subcomponents are expected to fail independently, the probability of all three subcomponents failing is calculated to be extraordinarily small.

In view of the foregoing, a need exists for a pneumatic actuation controller architecture that offers additional feedback, without requiring complex heuristics and/or experimentation. More specifically, a need exists for a triplex-redundant architecture for pneumatic actuation in safety-critical aerospace applications.

SUMMARY OF THE INVENTION

The present invention is directed to a pneumatic actuation controller design that employs force feedback to provide a robust controller design. More specifically, the present invention is directed to a triplex architecture for pneumatic actuation system that employs feedback compensation techniques, including current feedback, force feedback, etc.

According to a first aspect, a triplex pneumatic architecture system comprises: a first pneumatic subsystem to control movement of a first piston in a first pneumatic actuation assembly, the first pneumatic subsystem comprising a first servo driver, a first servo valve, a first current sensor, a first dump valve coupled to a first relay, a first position sensor, and a first processor to communicate a first control command to the first servo driver, wherein the first servo driver transmits a control current to the first servo valve to selectively actuate the first pneumatic actuation assembly in response to the first control command, wherein the first position sensor is configured to measure linear movement of the first piston and to provide position feedback of the first piston, wherein the first current sensor is configured to measure the control current and to output a first measured current value, and wherein the first processor is configured to generate a termination signal to actuate the first relay and open the first dump valve; a second pneumatic subsystem to control movement of a second piston in a second pneumatic actuation assembly, the second pneumatic subsystem comprising a second servo driver, a second servo valve, a second current sensor, a second dump valve coupled to a second relay, a second position sensor, and a second processor to communicate a second control command to the second servo driver, wherein the second servo driver transmits a control current to the second servo valve to selectively actuate the second pneumatic actuation assembly in response to the second control command, wherein the second position sensor is configured to measure linear movement of the second piston and to provide position feedback of the second piston, wherein the second current sensor is configured to measure the control current and to output a second measured current value, and wherein the second processor is configured to generate a termination signal to actuate the second relay and open the second dump valve; a third pneumatic subsystem to control movement of a third piston in a third pneumatic actuation assembly, the third pneumatic subsystem comprising a third servo driver, a third servo valve, a third current sensor, a third dump valve coupled to a third relay, a third position sensor, and a third processor to communicate a third control command to the third servo driver, wherein the third servo driver transmits a control current to the third servo valve to selectively actuate the third pneumatic actuation assembly in response to the third control command, wherein the third position sensor is configured to measure linear movement of the third piston and to provide position feedback of the third piston, wherein the third current sensor is configured to measure the control current and to output a third measured current value, and wherein the third processor is configured to generate a termination signal to actuate the third relay and open the third dump valve; a communication bus to communicatively couple each of the first processor, the second processor, and the third processor, wherein the first processor is configured to receive each of the first measured current value, the second measured current value, and the third measured current value via the communication bus, wherein the second processor is configured to receive each of the first measured current value, the second measured current value, and the third measured current value via the communication bus, wherein the third processor is configured to receive each of the first measured current value, the second measured current value, and the third measured current value via the communication bus, wherein each of the second processor and the third processor is configured to generate the termination signal and to communicate the termination signal to the first relay when the first measured current value deviates from the second and third measured current values by a predetermined error value, and wherein the first relay is configured to open the first dump valve to vent the first pneumatic actuation assembly upon receipt of the termination signal.

According to a second aspect, a triplex pneumatic architecture system comprises: a first pneumatic subsystem to control a first pneumatic actuation assembly, the first pneumatic subsystem comprising a first current sensor to measure a control current from a first servo driver to a first servo valve to output a first measured current value, and a first dump valve coupled to a first relay, wherein a first processor is configured to generate a termination signal to actuate the first relay to open the first dump valve; a second pneumatic subsystem to control a second pneumatic actuation assembly, the second pneumatic subsystem comprising a second current sensor to measure a control current from a second servo driver to a second servo valve to output a second measured current value, and a second dump valve coupled to a second relay, wherein a second processor is configured to generate a termination signal to actuate the second relay to open the second dump valve; a third pneumatic subsystem to control a third pneumatic actuation assembly, the third pneumatic subsystem comprising a third current sensor to measure a control current from a third servo driver to a third servo valve to output a third measured current value, and a third dump valve coupled to a third relay, wherein a third processor is configured to generate a termination signal to actuate the third relay to open the third dump valve; and a communication bus to communicatively couple each of the first, second, and third pneumatic subsystems, wherein each of the first processor, the second processor, and the third processor is configured to generate the termination signal and to communicate the termination signal to the first relay when the first measured current value deviates from the second and third measured current values by a predetermined error value.

According to a third aspect, a pneumatic architecture system comprises: a pneumatic subsystem to control a pneumatic actuation assembly, wherein the pneumatic actuation assembly includes a cylinder and a piston, wherein the piston divides an internal area of the cylinder into a first area having a first pressure and a second area having a second pressure; a servo driver to generate a control current based at least in part on a control command from a processor; a servo valve to selectively actuate the pneumatic actuation assembly by selectively adjusting the first pressure and the second pressure in response to the control current; one or more pressure sensors to provide to the processor pressure data reflecting the first pressure and the second pressure, wherein the processor is configured to perform real-time total force feedback based at least in part on the pressure data.

In certain aspects, each of said first, second, and third pneumatic subsystems includes a first dump valve and a second dump valve.

In certain aspects, wherein the first dump valve vents a first portion of a pneumatic cylinder and the second dump valve vents a second portion of a pneumatic cylinder.

In certain aspects, the first dump valve and the second dump valve are controlled by a common relay.

In certain aspects, the first, second, and third control commands are like commands.

In certain aspects, the first, second, and third pneumatic actuation assemblies are coupled to a common load.

In certain aspects, each of the second processor and the third processor is configured to communicate the termination signal to the first relay over the communication bus.

In certain aspects, the termination signal is a 5V DC high signal.

In certain aspects, the predetermined error value is calculated by determining the differences between each of the first, second, and third measured currents.

In certain aspects, each of said first, second, and third pneumatic subsystems includes a pressure sensor to provide real-time pressure feedback to each of the first, second, and third processors.

In certain aspects, each of said first, second, and third pneumatic subsystems includes a plurality of pressure sensors to provide real-time pressure feedback to each of the first, second, and third processors.

In certain aspects, said plurality of pressure sensors includes a first pressure sensor to measure a first pressure of a first portion of a pneumatic cylinder and a second pressure sensor to measure a second pressure of a second portion of the pneumatic cylinder.

In certain aspects, each of said first, second, and third pneumatic subsystems includes a pressure sensor to provide real-time total force feedback to each of the first, second, and third processors, wherein the pressure sensor generates pressure data and the total force is calculated as a function of the pressure data and a cross sectional area of air acting on the piston.

In certain aspects, each of said first, second, and third pneumatic subsystems includes a linear position sensor to provide real-time position feedback to each of the first, second, and third processors, wherein the pressure sensor generates pressure data and the total force is calculated as a function of the pressure data.

In certain aspects, the communication bus includes a current bus and a termination bus.

In certain aspects, each of said first, second, and third pneumatic subsystems includes two relays.

In certain aspects, wherein each of said three relays is configured to receive a termination signal from a different one of said first, second, and third pneumatic subsystems In certain aspects, each of said three relays configured to control a common dump valve.

In certain aspects, each of said three relays configured to control a different dump valve.

In certain aspects, each of said three relays configured to control a different dump valve to vent pressure from a common air supply line.

In certain aspects, each of said first, second, and third servo valves is a three-position pilot-valve system.

In certain aspects, the first, second, and third pneumatic actuation assemblies are arranged in parallel and in a triangular configuration.

In certain aspects, the distal ends of each of said first, second, and third pneumatic actuation assemblies are mechanically coupled to one another via a bracket plate.

In certain aspects, the common load is a flight control of an aerial vehicle.

In certain aspects, the first, second, and third control commands are like commands from a flight control system of the aerial vehicle.

In certain aspects, each of the first processor, the second processor, and the third processor is configured to determine when the first measured current value deviates from the second and third measured current values using a majority vote algorithm.

In certain aspects, each of the first, second, and third processors are configured to communicate a control command to the first, second, or third servo drivers, wherein the control command is a command from a flight control system of the aerial vehicle.

In certain aspects, the total force is calculated as a function of the pressure data and the piston's surface area.

In certain aspects, the pneumatic architecture system further comprises a first dump valve and a second dump valve, the first dump valve being fluidly positioned in-line between the servo valve and the first area and the second dump valve being fluidly positioned in-line between the servo valve and the second area. The first dump valve and the second dump valve may be configured to vent pressure from the cylinder under control of one or more relays. Further, the one or more relays may be configured to be triggered by a termination signal to vent the first dump valve and the second dump valve.

In certain aspects, the processor is configured to generate and communicate the termination signal to the relay based on the real-time total force feedback and position feedback.

In certain aspects, the processor is configured to generate and communicate the termination signal to the relay when the real-time total force feedback deviates from a predetermined range.

In certain aspects, the pneumatic architecture system is coupled to a second pneumatic architecture system and a third pneumatic architecture system to provide a triplex pneumatic architecture system.

DESCRIPTION OF THE DRAWINGS

These and other advantages of the present invention will be readily understood with the reference to the following specifications and attached drawings wherein.

DETAILED DESCRIPTION

Figure 1:
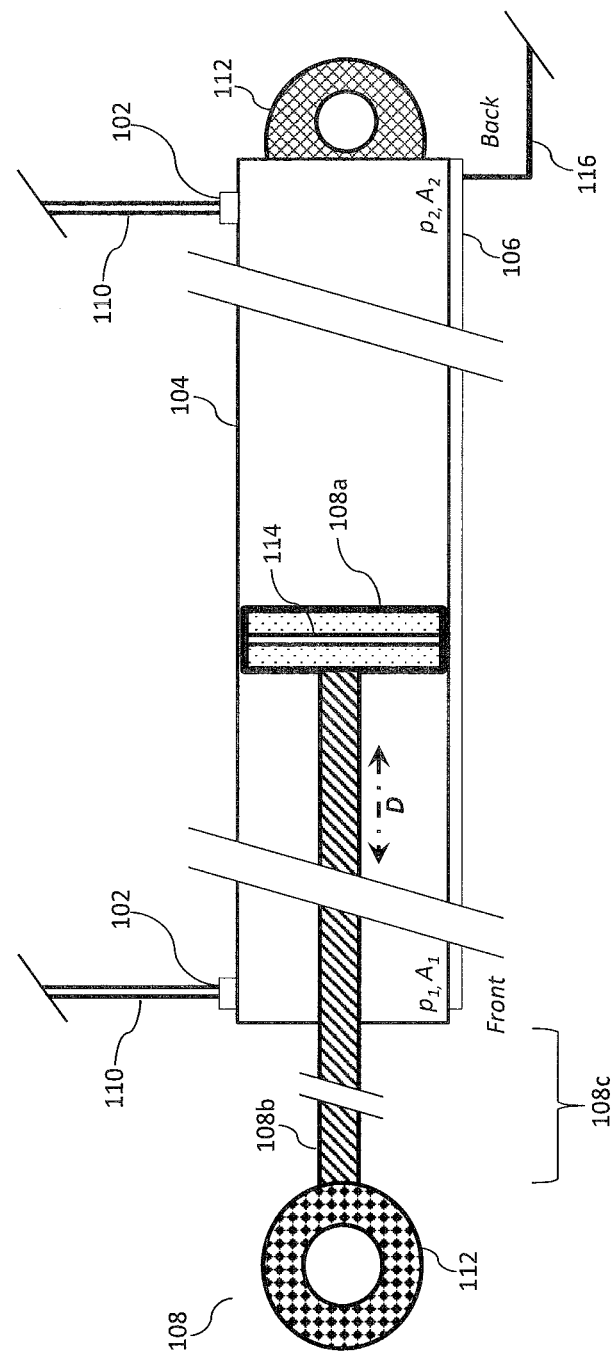
FIG. 1 is a schematic diagram of an example linear pneumatic actuation assembly.

Preferred embodiments of the present invention will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the invention in unnecessary detail. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations. The terms horizontal and vertical, as used herein, are used to describe angles or planes relative to the ground, such as when the aircraft is on the ground.

The terms "aerial vehicle" and "aircraft" refer to a machine capable of flight, including, but not limited to, fixed-wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters), tilt-rotor/tilt-wing aircraft, and/or the new category of aircraft, as disclosed herein.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "communicate" and "communicating," as used herein, refer to both transmitting, or otherwise conveying, data from a source to a destination and delivering data to a communications medium, system, channel, network, device, wire, cable, fiber, circuit, and/or link to be conveyed to a destination.

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

Disclosed herein is a pneumatic actuation system controller that employs force feedback to provide a robust controller design. The pneumatic actuation system controller may employ system dynamics modeling to enable use of modern multi-input/multi-output (MIMO) methods available for linear (or linearized) systems. The pneumatic actuation system may be embodied using a triplex architecture to assess its own health and to mitigate failure, while remaining able to fully perform its function. The pneumatic actuation system may employ feedback control from other information sources, including electrical current flowing in the motor that drives the pneumatic servo valve, in addition to, or in lieu of, the force feedback.

The pneumatic actuation systems discussed herein are suitable for a number of potential industrial applications, such as control actuators in the aerospace market, industrial machines, and robotics, where it may be embodied in a dedicated controller. For example, the various pneumatic systems and control methods disclosed herein may be applied to aerial vehicle control systems, including autopilots. An example aerial vehicle control system that could benefit from the present disclosure is disclosed by commonly owned U.S. patent Ser. No. 15/464,786 (the "786 Application") by Jessica E. Duda et al, filed Mar. 21, 2017 and titled "Aircrew Automation System and Method." The 786 Application discloses an aircrew automation system having an actuation system to actuate one or more flight controls of the aircraft in response to commands from the core platform. The actuation system may employ the disclosed pneumatic actuation systems and techniques.

Employing force feedback in a pneumatic actuation system controller offers a number of benefits that require particular rigor and/or performance guarantees. First, a pneumatic actuation system with force feedback is much simpler to implement in software than other, non-linear approaches. As a result, the testing methodology and potential certification of the implemented software in a controller is more straightforward. Second, a pneumatic actuation system controller with force feedback enables the use of modern control-system designs and performance-analysis techniques during the design phase. Thus, making informed decisions about system bandwidth, disturbance rejection, formal estimates of robustness bounds, frequency response, etc. Third, a pneumatic actuation system controller with force feedback is tolerant to variations in the physical system. Relevant examples include the ability to connect to a wide range of loads and tolerance to wide variations in supply pressure (especially during startup). Finally, a pneumatic actuation system controller with force feedback lends itself directly to the ability to transition rapidly and seamlessly between position control and direct force control.

A triplex architecture design enables the pneumatic system to provide an alert to the operator in real-time such that the operator can safely and smoothly transition control of the aerial vehicle, or in the event of fully unmanned operations, end the mission and return to base.

As will be appreciated, the disclosed triplex architecture also offers a number of advantages. First, the triplex architecture provides three redundant pneumatic control lines such that the overall pneumatic system can operate with one or two lines disabled. Second, each line can operate its own closed loop control, but the pneumatic pistons can be coupled in a single mechanical assembly. Third, each line performs continuous built-in testing (CBIT) on itself and its two sibling pneumatic lines. Fourth, the triplex architecture can employ voting techniques to detect failure of a single system and disable that system. For example, the triplex architecture is able to detect failure or disconnection of one or more pneumatic components (e.g., the piston, servo driver, processor, sensors, etc.). Finally, the triplex architecture uses real-time feedback compensation to enable failure detection using only one node in each pneumatic line. Without the pressure feedback compensation, for example, the triplex architecture could require additional shared connections between each of the three pneumatic lines, which would also result in a more complex voting algorithm for the CBIT.

FIG. 1 illustrates an example linear pneumatic actuation assembly 100 for use in a pneumatic system. As illustrated, the pneumatic actuation assembly 100 generally comprises a cylinder 104, a linear position sensor 106 operatively coupled with the cylinder 104, a piston assembly 108 slideably engaged with the cylinder 104, a set of air couplings 102 (e.g., air inlets/outlets), and a plurality of load connectors 112. The air couplings 102 are configured to couple the cylinder 104 with air supply lines 110 and other components of a pneumatic system.

As illustrated, the piston assembly 108 generally includes a piston 108a, a piston rod 108b, and a tail rod portion 108c. In operation, the piston assembly 108 is configured to be linearly displaced (laterally relative to the length of the cylinder 104) along the displacement axis D between its terminal ends (e.g., a front terminal end and a back terminal end), thereby driving a load via the piston rod 108b. The outer diameter of the piston 108a is sized and shaped to contact/slideably engage the interior wall of the cylinder 104, thereby dividing the total internal area (A) of the cylinder 104 in (1) a first area ($A_1$) having a first pressure ($p_1$) to the left (towards the front) of the piston 108a and (2) a second area ($A_2$) having a second pressure ($p_2$) to the right (towards the back) of the piston 108a. The piston 108a may further include one or more O-rings 114 to form or maintain the seal between the outer diameter of the piston 108a and the interior wall of the cylinder 104. The various hardware components of the pneumatic actuation assembly 100, such as the piston assembly 108 and the cylinder 104, may be constructed from, for example, steel (e.g., chrome plated carbon steel, 316 stainless steel, etc.), metal alloys (e.g., aluminum alloys, such as cataphoresis & rilsan coated cast aluminum alloy, etc.), non-metals (e.g., nylon, polyamides, such as glass reinforced polyamide, etc.), and the like.

The linear position sensor 106 provides, via a conductor 116, real-time position feedback (analog or digital electronic) to a controller (e.g., a processor) to indicate the amount of piston rod 108b extension throughout the range of its stroke. The linear position sensor 106 may be, for example, a potentiometer to measure the angle, speed, and displacement to facilitate a closed loop feedback control. Alternatively, the linear position sensor 106 may employ one or more other in-cylinder linear displacement transducers (LDTs) or external LDTs. The in-cylinder LDT may use, for example, a magnetostrictive transducer, while external LDTs may use an external sensing bar that employs Hall-Effect technology to sense the position of a permanent magnet position on the piston 108a. In operation, the magnet propagates a magnetic field through the cylinder 104 that provides a locating signal to the sensor.

The air supply lines 110 are used to convey pressurized atmospheric air (or another gas, such as compressed carbon dioxide) between the pneumatic actuation assembly 100 and an air supply (and/or between other components of a pneumatic system). The air supply lines 110 may employ one or more of polyurethane (PUR) tubing, nylon tubing, PTFE tubing, polyurethane (PUR) tubing, etc. The air supply lines 110 are coupled to the pneumatic actuation assembly 100, or another component, using one or more air couplings 102. The one or more air couplings 102 may employ various types of tubing/hose fittings, such as threaded tubing fittings, barbed hose fittings, quick-disconnect air couplings, etc.

The pneumatic actuation assembly 100 may be configured as a push/push arrangement whereby the piston assembly 108 is displaced by selectively increasing pressure within the cylinder 104 on either side of the piston 108a. More specifically, displacement of the piston assembly 108 is controlled by selectively controlling/adjusting the first pressure ($p_1$) and the second pressure ($p_2$) via a control/servo valve. When the first pressure ($p_1$) and the second pressure ($p_2$) are equal, the piston assembly 108 is static (i.e., not moving). To displace the piston assembly 108 toward the back, the first pressure ($p_1$) may be increased while the second pressure ($p_2$) is decreased to a predetermined pressure (or held constant), thereby pushing the piston assembly 108 to the right until it reaches a predetermined position or its terminal end (e.g., a hard over at the front terminal end). Upon reaching the predetermined position or back terminal end, the second pressure ($p_2$) may be increased while the first pressure ($p_1$) is decreased to a predetermined pressure, thereby pushing the piston assembly 108 in the other direction (i.e., to the left) until it reaches its predetermined position or terminal end (e.g., a hard over at the front terminal end).

The pneumatic actuation assembly 100 includes a plurality of load connectors 112 to couple with other components of the system. A first load connector 112 may be positioned at a distal end of the tail rod portion 108c and a second load connector 112 at the back end of the cylinder 104. The load connector 112 may be, as illustrated, a clevis to which another component can be fastened by means of a bolt or pin passing through the ends of the connector. While a clevis is illustrated, other load connectors 112 are contemplated, including threaded rods, hooks, one or two way connector clamps, flanged one or two way connector clamps, T-angle connector clamps, swivel connector clamps, etc. To mitigate friction during use, the load connector 112 may include one or more permanent or replaceable bushings, bearings (e.g., ball bearings), etc.

Figure 2:
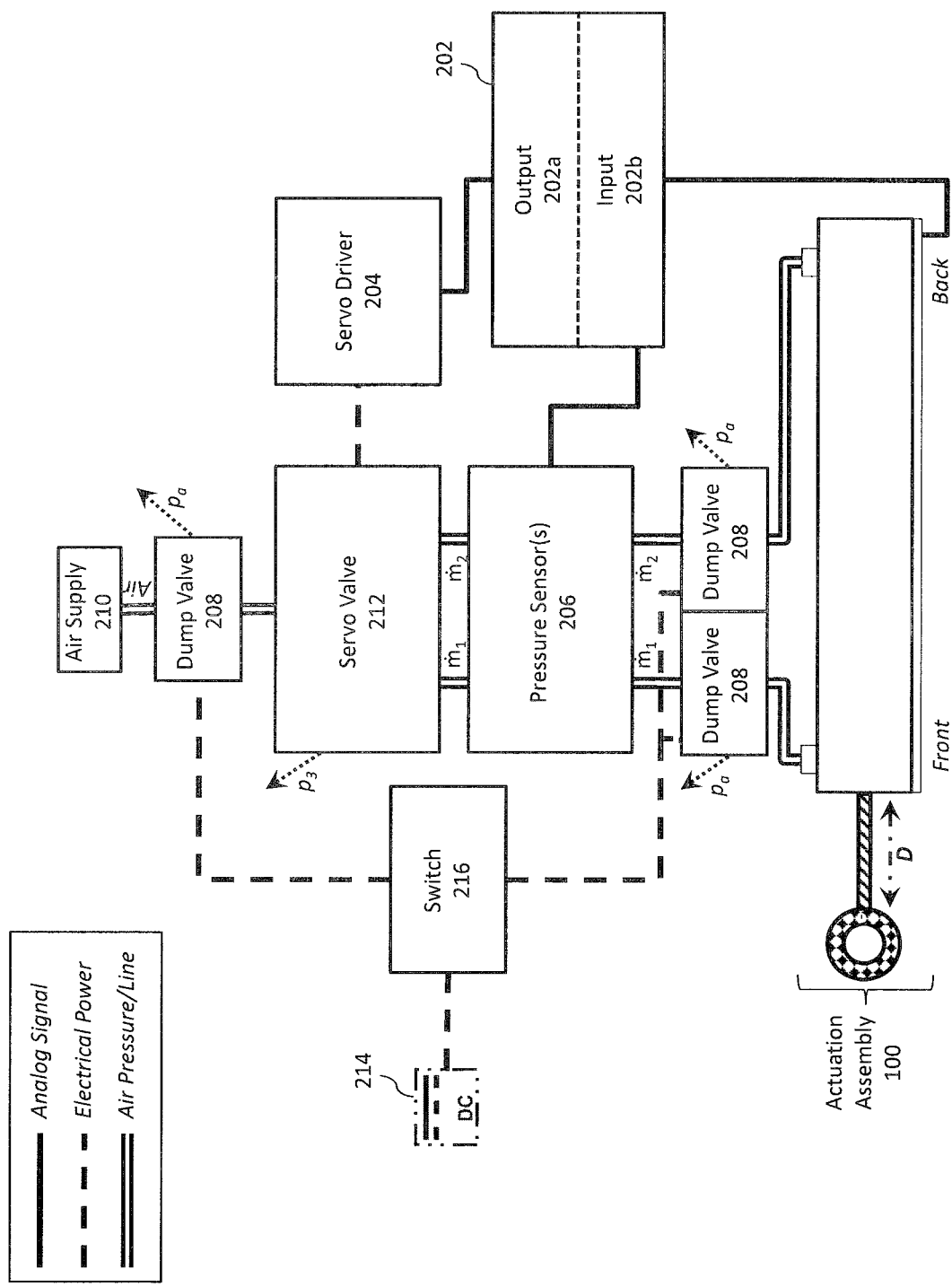
FIG. 2 is a schematic diagram of a single line pneumatic system for a linear pneumatic actuation assembly.

FIG. 2 illustrates a schematic of a single line pneumatic system 200 that does not employ status self-monitoring. As illustrated, the single pneumatic system 200 generally comprises a pneumatic actuation assembly 100, a processor 202, a servo driver 204, one or more pressure sensors 206, one or more dump valves 208, an air supply 210, an electromechanical servo valve 212, a power supply 214, and a switching device 216. The various components of the pneumatic system 200 may be modular components that are designed to be replaced quickly at an operating location (e.g., as line-replaceable units (LRU)).

While the one or more pressure sensors 206 are illustrated in the various figures as a single block, the one or more pressure sensors 206 are not necessarily a single component. For example, separate pressure sensors 206 may be used to detect the pressure within the cylinder 104 on either side of the piston 108a ($p_1$, $p_2$). The pneumatic actuation assembly 100 may be mechanically attached (e.g., via a piston rod 108b) to a load 306, which is illustrated as including a mass 306a, a linear spring 306b, and a viscous damper 306c.

The air supply 210 operates as an input to the servo valve 212. The air supply 210 may be, for example, an air compressor to provide compressed air at about 50-150 pound-force per square inch (psi), more preferably about 60-120 psi, or most preferably about 80 psi. One of skill in the art, however, would appreciate that the pressure level (psi) of the compressed air can depend on, inter alia, specific components, desired dynamic performance, desired system efficiency, etc. Therefore, the present disclosure should not be construed as limited to the provided example psi ranges. The pneumatic actuation assembly 100 is dual-acting in that pressure could be supplied from the air supply 210 to either side of the cylinder 104 to generate push or pull forces at the piston output.

The electromechanical servo valve 212, under the control of an electric motor via a motor current, controls the airflow ($\dot{m}_1$, $\dot{m}_2$) from the air supply 210 to the cylinder 104 to selectively adjust the first pressure ($p_1$) and the second pressure ($p_2$), thereby selectively displacing the piston assembly 108 in the cylinder 104. To that end, the servo valve 212 is configured to direct compressed air to the cylinder 104 at one or more predetermined airflow rates ($\dot{m}_1$, $\dot{m}_2$). For example, the servo valve 212 may meter the flow of air to the cylinder 104 in response to an electrical input signal or command from the servo driver 204, which may be a high-bandwidth motor current controller.

The servo valve 212 may be, for example, a three-position pilot-valve system. In the first position, the servo valve 212 is closed to prohibit airflow ($\dot{m}_1=\emptyset$, $\dot{m}_2=\emptyset$) between the air supply 210 and either side of the piston assembly 108 (within the cylinder 104). In the second position, the servo valve 212 routes compressed airflow from the air supply 210 to the front side of the piston assembly 108 ($\dot{m}_1=+$) and simultaneously vents pressure ($p_3$) from the back side of the piston assembly 108 ($\dot{m}_2=-$). Finally, in the third position, the servo valve 212 routes compressed airflow from the air supply 210 to the back side of the piston assembly 108 ($\dot{m}_2=+$) and simultaneously vents pressure ($p_3$) from the front side of the piston assembly 108 ($\dot{m}_1=-$). In the second and third positions, the airflow rates ($\dot{m}_1$, $\dot{m}_2$) can be controlled independently and proportionately in response to a command to the servo valve 212 from the servo driver 204.

Suitable servo valves include those available from Enfield Technologies, such as the Enfield Technologies LS-V05s model valve, which is a 5-Ported, 4-Way proportional valve with a bi-directional linear force motor and spool and sleeve.

The servo driver 204 controls the servo valve 212 using a motor current based upon instructions received from the processor 202 to control position, velocity, pressure, or force of the piston assembly 108. The processor 202 includes an output circuitry 202a (e.g., to output control commands or other instructions) and an input circuitry 202b (e.g., to receive feedback and/or instructions). The processor 202 may be, for example, a programmable System-on-Chip (PSoC) microcontroller integrated circuit (IC). Example PSoC IC chips may include a CPU core and mixed-signal arrays of configurable integrated analog and digital peripherals.

The processor 202 may be further coupled with one or more sensors to monitor the state of the piston assembly 108. As will be discussed, the processor 202 may be configured to perform real-time control of the pneumatic system 200. To that end, the processor's 202 control law may use feedback signals from the one or more sensors. The one or more sensors may include, for example, the linear position sensor 106 and one or more pressure sensors 206, which monitor the position of the piston 108a and the pressure within the cylinder 104 on each side of the piston 108a, respectively. The one or more pressure sensors 206 may be positioned within the cylinder 104, between the cylinder 104 and the control valve 108 (e.g., in-line within said supply lines 110), or elsewhere in the system. Further, in connection with aerial vehicles, the processor 202 may receive desired position commands from a flight control system.

The pneumatic system 200 may further include one or more dump valves 208 to disable/disengage the pneumatic actuation assembly 100 by releasing air pressure at one or more predetermined points within the pneumatic system 200. As illustrated, the pneumatic system 200 may include dump valves 208 on each side of the servo valve 212 to facilitate a complete shutdown of the pneumatic system 200. Specifically, three dump valves 208 may be provided. The first is fluidly positioned to release vent pressure ($p_a$) in-line between the servo valve 212 and the air supply 210. The second is fluidly positioned to release vent pressure ($p_a$) in-line between the servo valve 212 and the front end air coupling 102. The third is fluidly positioned to release vent pressure ($p_a$) in-line between the servo valve 212 and the back end air coupling 102.

Each dump valve 208 may be electrically coupled to a power supply 214, which provides the power necessary to activate and/or deactivate the dump valve 208 (e.g., by activating or deactivating a solenoid within the dump valve 208) to selectively vent the pressure ($p_a$). The power supply 214 may be, for example, a 12v-24v DC power supply, such as a battery, transformer, vehicle's power supply (whether a land vehicle or aerial vehicle), etc.

To control actuation of the dump valves 208, a switching device 216 may be provided between the power supply 214 and each of the dump valves 208 to selectively supply power from the power supply 214 to the dump valves 208. The switching device 216 may employ one or more of a button (momentary button), a switch, a relay, etc.

The switching device 216 may be manually actuated by a controller or the operator to engage and/or disengage the pneumatic system 200 (e.g., pneumatic actuation assembly 100) or portions therefore. For example, if the operator wishes to disengage the pneumatic system 200, the operator may trigger the switching device 216 to activate one or more dump valves 208 positioned throughout the pneumatic system 200 to release the pressure from the pneumatic actuation assembly 100. In certain aspects, the switching device 216 may enable the operator to activate only a subset of the dump valves 208. If the pneumatic system 200 is used to provide autopilot functionality, the pilot may trigger one or more dump valves 208 (e.g., all dump valves 208) to immediately disable the autopilot functionality and return control of the aircraft to the pilot. A shut down of the pneumatic system 200, however, could result in an abrupt and immediate transition to pilot control.

Figure 3A:
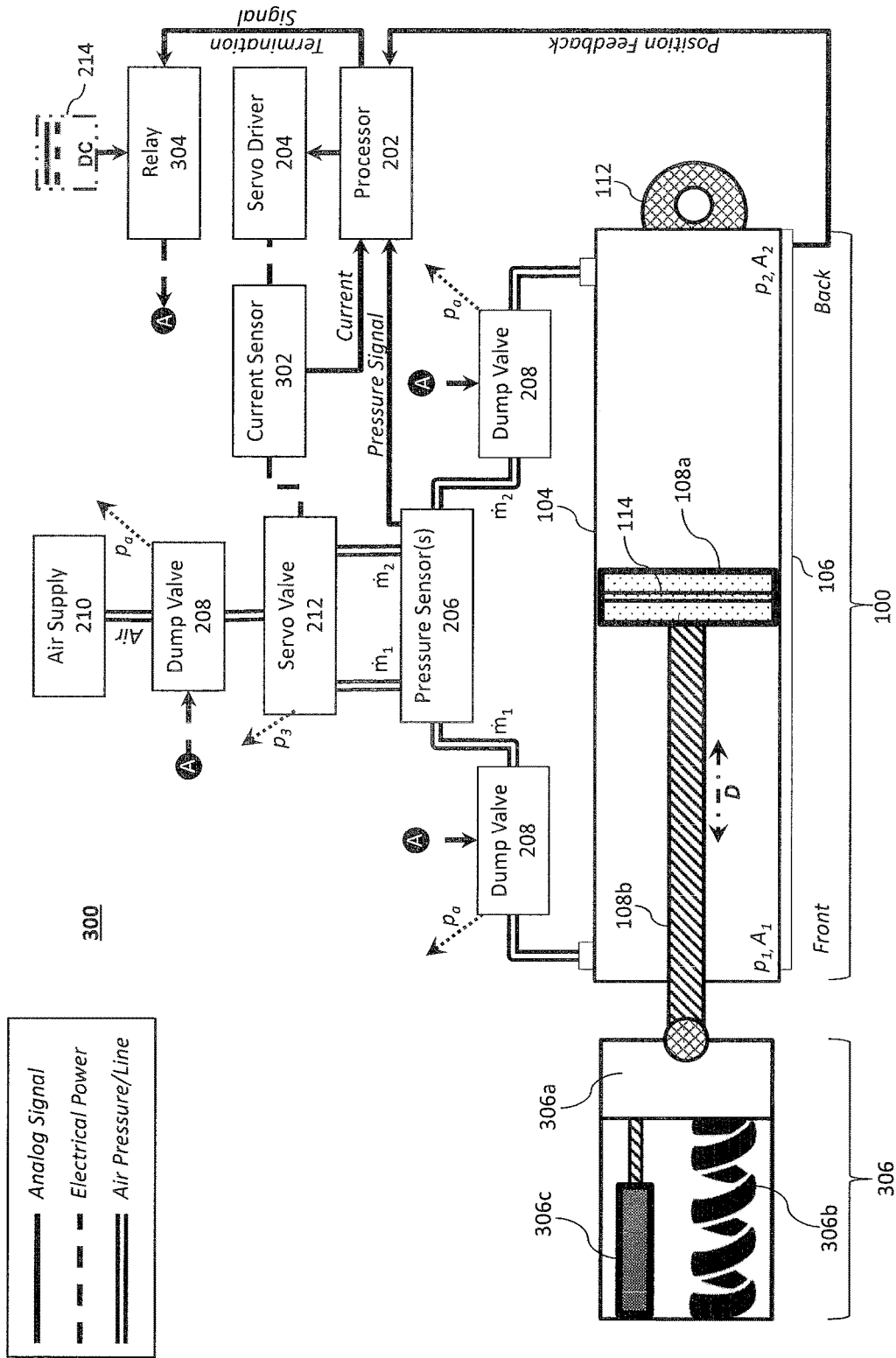
FIGS. 3a through 3c are schematic diagrams of a single line continuous built-in test (CBIT) pneumatic system for a linear pneumatic actuation assembly.
Figure 3B:
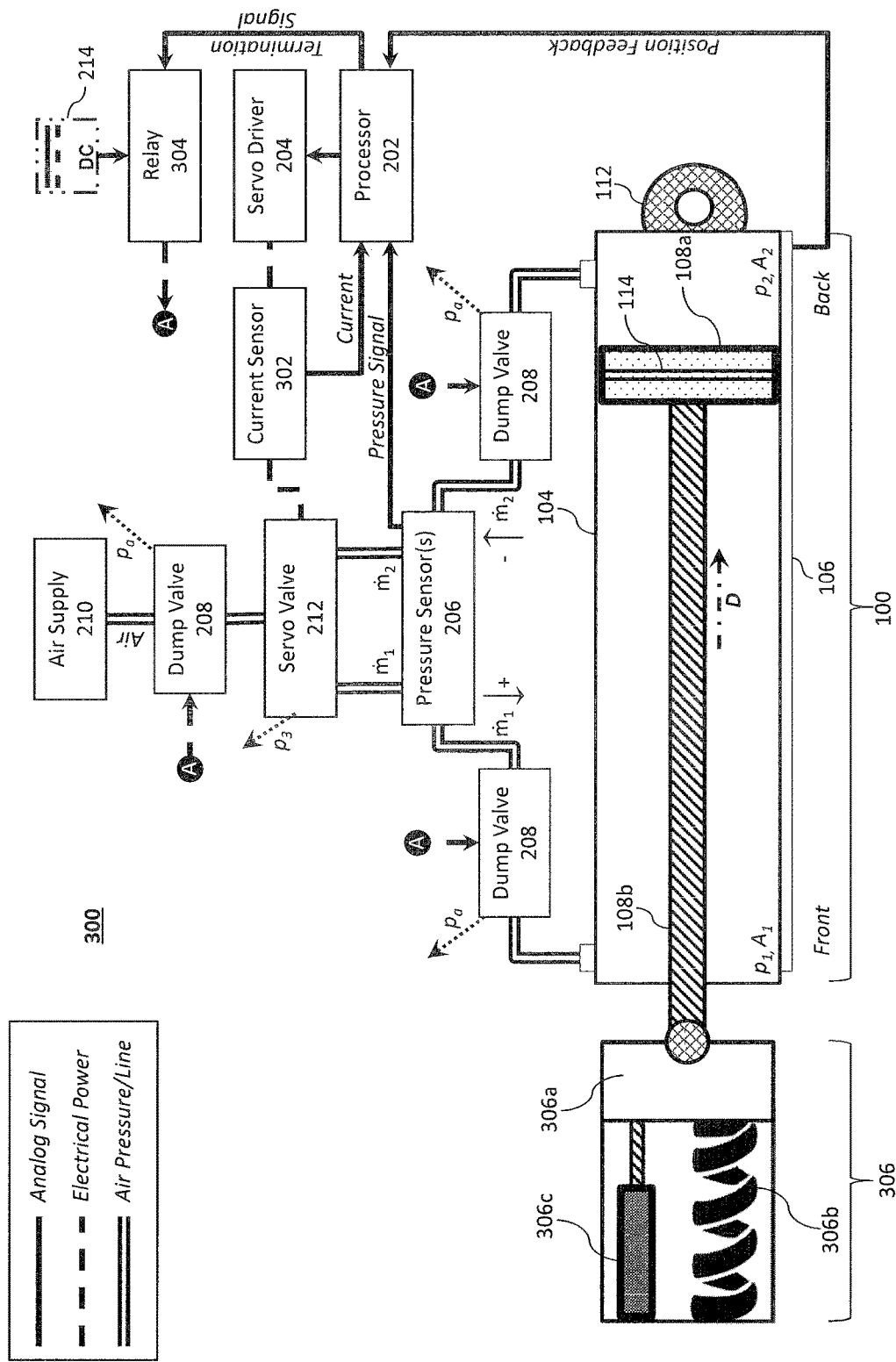
Figure 3C:
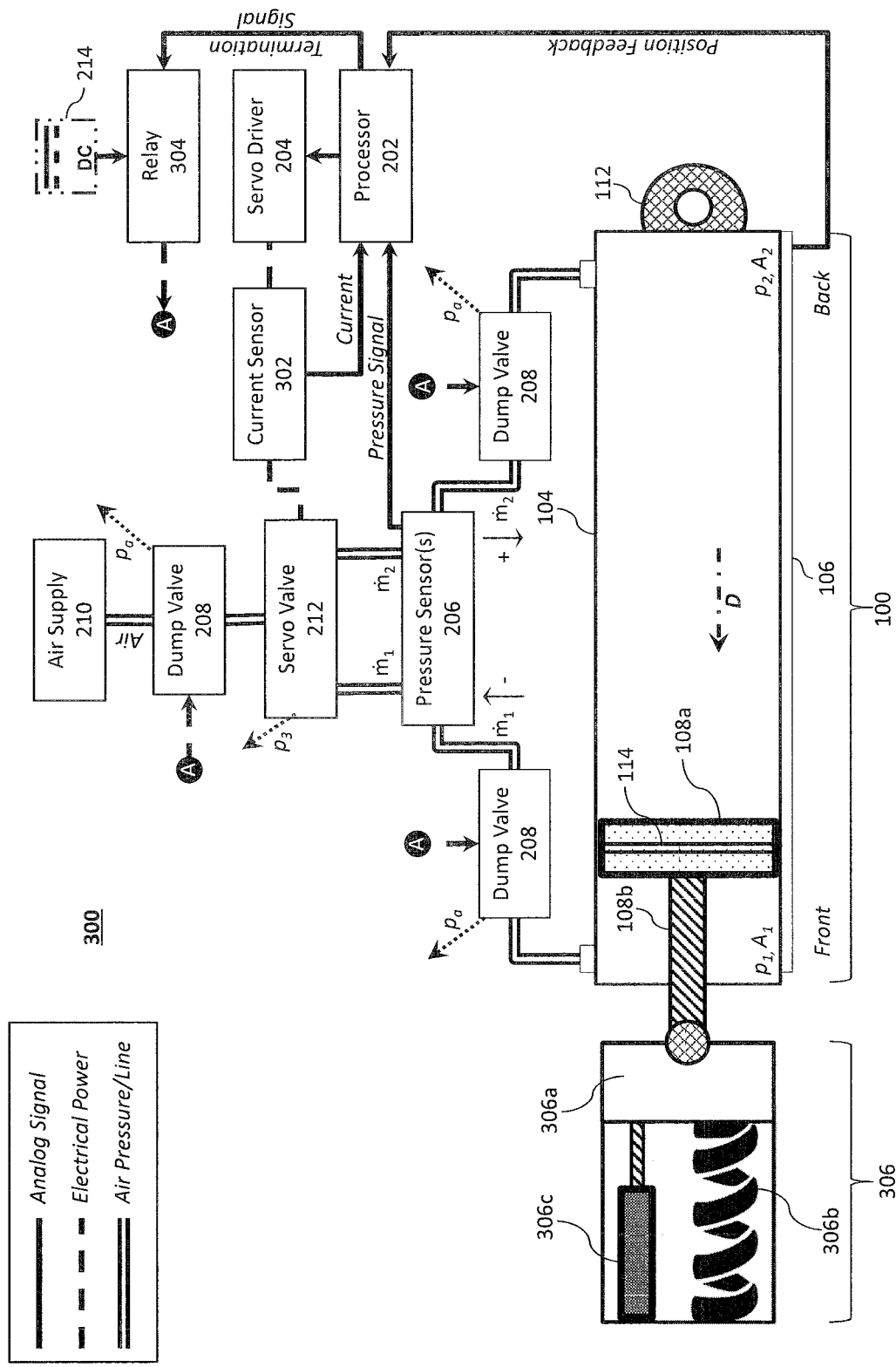

FIGS. 3a through 3c illustrate a schematic of a single line continuous built-in test (CBIT) pneumatic system 300. The various components of the pneumatic system 300 may be provided as modular components. As illustrated, the single line CBIT pneumatic system 300 generally comprises a pneumatic actuation assembly 100, a processor 202, a servo driver 204, one or more pressure sensors 206, one or more dump valves 208, an air supply 210, an electromechanical servo valve 212, a power supply 214, a relay 304, and a current sensor 302. As can be appreciated, the single line CBIT pneumatic system 300 incorporates many of the components of the pneumatic system 200, but further includes a current sensor 302 to measure an electrical motor current between the servo driver 204 and the servo valve 212. The current sensor 302 outputs the measurement data (i.e., a measured motor current) to the input circuitry 202b of the processor 202.

The piston assembly 108 is illustrated at FIG. 3a in an intermediate position, where the cross-sectional area of the piston in the front chamber ($A_1$) is similar to, but typically smaller than the cross-sectional area of the piston in the back chamber ($A_2$), because the front cross-sectional area also includes the piston rod 108b, which exits the piston chamber of the cylinder 104. In other words, the first area ($A_1$) is smaller than the second area ($A_2$) at the intermediate position because the portion of the piston rod 108b within the cylinder 104 occupies a non-trivial amount of the first area ($A_1$). When the force on the front side of the piston ($f_1$), which is equal to the product of ($A_1$) and ($p_g$), equals the force on the back side of the piston ($f_2$), which is equal to the product of ($A_2$) and ($p_2$), the piston assembly 108 is static, assuming no external load is applied to the piston rod. To displace the piston assembly 108 toward the back, under control of the servo valve 212, the first pressure ($p_1$) may be increased while the second pressure ($p_2$) is decreased to a predetermined pressure (or held constant) by venting a predetermined amount of air pressure ($p_3$), thereby pushing the piston assembly 108 to the right until it reaches a predetermined position or its terminal end (e.g., the front terminal end), as illustrated in FIG. 3b. Upon reaching the predetermined position or a hard over at the back terminal end, the second pressure ($p_2$) may be increased while the first pressure ($p_1$) is decreased to a predetermined pressure by venting a predetermined amount of air pressure ($p_3$), thereby pushing the piston assembly 108 to the left until it reaches a predetermined position or its terminal end (e.g., the front terminal end), as illustrated in FIG. 3c.

Based at least in part on the measurement data from the current sensor 302, the processor 202 may instruct one or more of the dump valves 208 to vent line pressure ($p_a$) via, for example, one or more relays 304 positioned between the power supply 214 and the dump valves 208. With an accurate system model, CBIT of a single pneumatic actuation assembly 100 can be performed by comparing the measured motor current to the servo driver of the piston to an expected motor current of the servo driver (e.g., a stored data value). More specifically, failure of a component of the single line CBIT pneumatic system 300 can be identified when the measured motor current differs from the expected motor current by a predetermined deviation. This is possible because the relationship between the outgoing servo command and the measured motor current is known and a deviation from this known relationship is indicative of a malfunction. Detecting this failure allows the single line CBIT pneumatic system 300 to use the relay 304 and dump valves 208 to automatically disable its pneumatics by venting the air pressure ($p_3$) from the lines. As with the pneumatic system 200, a failure of the single-line CBIT pneumatic system 300 could result in an abrupt and immediate transition to pilot control.

In addition to current monitoring, the CBIT pneumatic system 300 may employ a multi-variable control design methodology that uses four states to describe and control the CBIT pneumatic system 300, including position of the pneumatic piston, velocity of the pneumatic piston, and the two system pressures (the pressure on each side of the pneumatic piston). To that end, the CBIT pneumatic system 300 may use one or more processors 118 and/or sensors to track the position of the piston assembly 108 (e.g., linear position sensor 106, which yields position data) and pressure sensors 206 to measure the pressure within the cylinder 104 on each side of the piston assembly 108. Using these sensors, the processor can calculate the piston speed of the piston 108a (e.g., based in part on the position data).

Figure 4A:
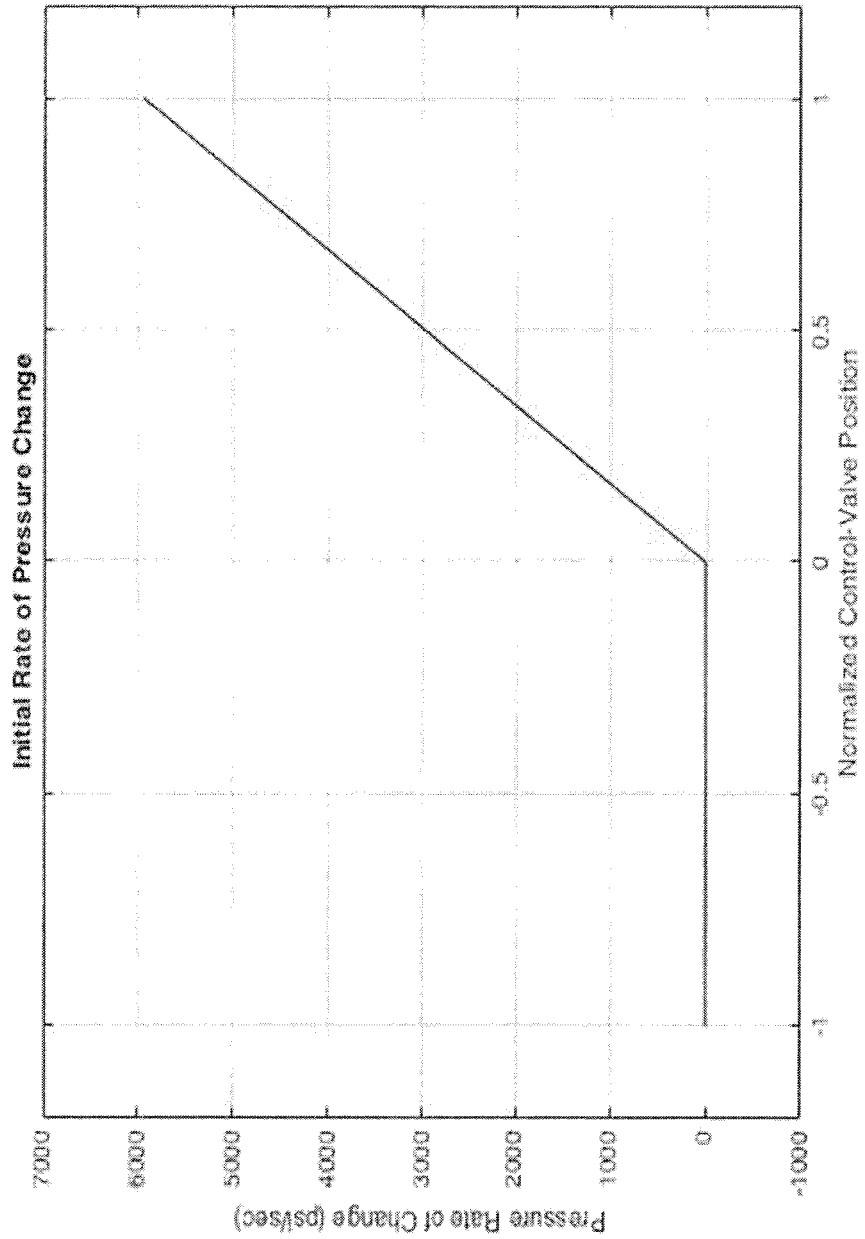
FIGS. 4a and 4b are graphs illustrating changes in pressure measurements over time in a pressure based feedback system.
Figure 4B:
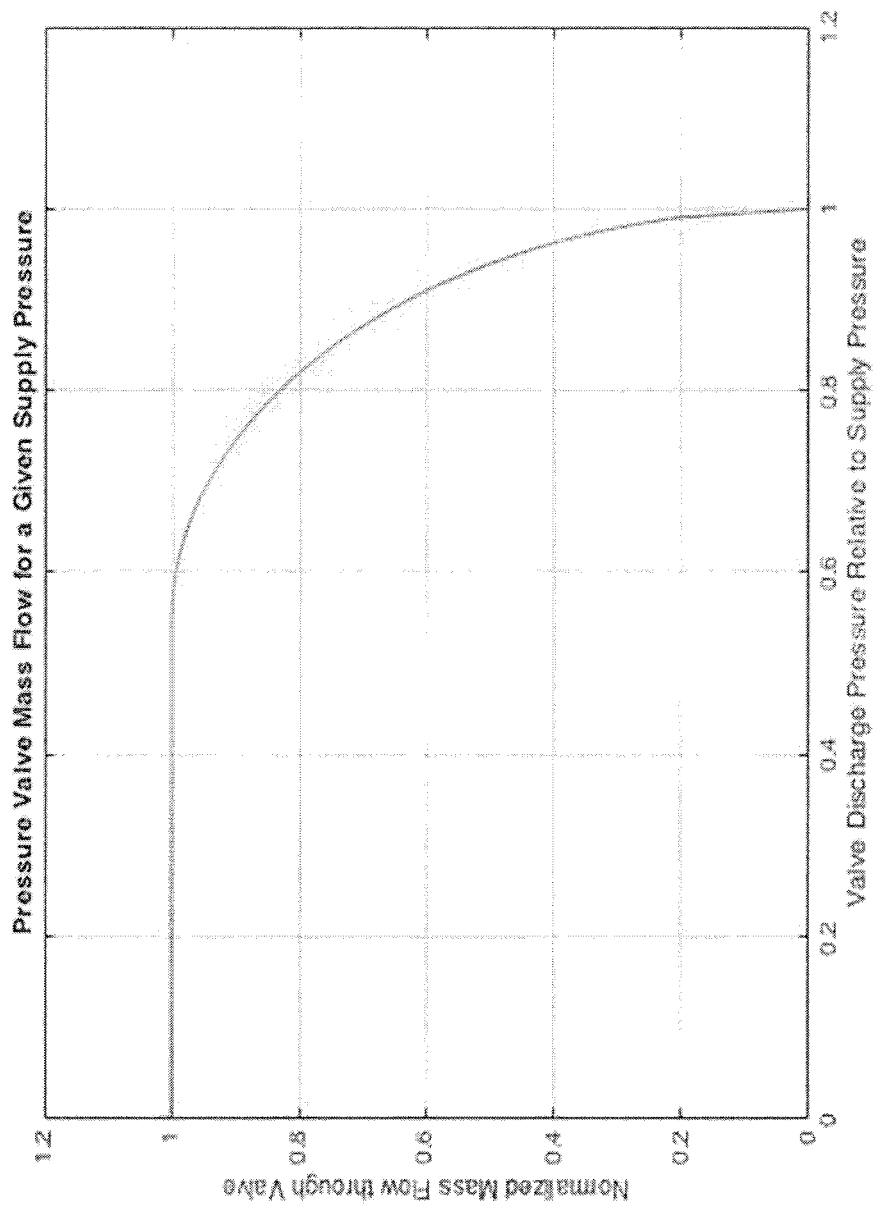

A challenge with using pneumatic actuators is that chamber pressure and mass flow rate of the air are generally non-linear, which reduces the efficacy of classical feedback control modeling tools that rely on linear modeling. Air pressure and mass flow rate in the piston chamber can be generally non-linear for a couple of reasons. First, with reference to FIG. 4a, the servo valve 212 can supply the one side (e.g., the backside) of the piston assembly 108 with a supply pressure or it can vent it when it nears the closed position. The graph 400a shows the initial rate of change of pressure for the backside of a piston assembly 108 depending on the position of the servo valve 212. As shown, there is a sharp change in the rate of pressure change when the servo valve 212 switches from venting to pressurizing one side of the piston. Second, with reference to FIG. 4b, the graph 400b illustrates that airflow through the servo valve 212 in a fixed control-valve command position is also non-linear. For instance, if the difference in pressure from one side of the servo valve 212 to the other is above a certain level, the airflow will choke—a phenomenon caused by the fact that air is a compressible gas. These phenomena can play a significant role in the dynamics of the piston, and thus of the complete feedback control system. Ignoring the pressure state, however, exposes a feedback controller to uncertainty, while predicting the pressure state requires complex nonlinear modeling.

To address these challenges, rather than modelling the CBIT pneumatic system 300 using the position of the piston assembly 108, the velocity of the piston assembly 108, and the two system pressure measurements ($p_1$, $p_2$), modeling may be achieved using a net force on the piston assembly 108 as feedback in lieu of the two system pressure measurements ($p_1$, $p_2$). The net force can be directly measured by the processor 202 using the two pressure signals ($p_1$, $p_2$) available from the one or more pressure sensors 206. Specifically, the net force (F) can be calculated using the cross sectional area of the piston 108a and the pressure applied to the piston 108a using Equations 1 and 2, where F is the net force in pounds, r is the radius of the piston 108a in inches, $p_1$ is the pressure applied at the front end in psi, $p_2$ is the pressure applied at the back end in psi, and $p_{ATM}$ is atmospheric pressure in psi (~14.7 psi).

$$F_{Front}=(Area_{cross-sectional})\times(P_{applied}=(\pi r^2)\times(p_1-P_{ATM}) \quad \text{Equation 1}$$

$$F_{Back}=(Area_{cross-sectional})\times(P_{applied})=(\pi r^2)\times(p_2-p_{ATM}) \quad \text{Equation 2}$$

If closed-loop control of the desired piston force (F) has sufficient accuracy and bandwidth, net force feedback can substantially reduce the non-linear effects in chamber pressure that arise from pneumatic actuation—e.g., choking. High-bandwidth force control requires fast measurement of piston chamber pressures, fast calculation of desired piston pressures, and high-bandwidth servo-valve actuation to achieve the desired piston chamber pressures. This high-bandwidth control of net force (F) substantially reduces the effect of non-linearity of the pressure behavior on the operation of the complete feedback control system for the piston. This enables the use of modern control design methods, which are often based on linear model systems. A benefit of these modern methods is that they are far more accurate when accounting for uncertainties in the system model than classical methods. The required bandwidth of the force controller to achieve desired performance can be dependent on the characteristic frequencies of the nonlinear effects that are present in the system, as well as the desired performance bandwidth of the close loop system. The precise bandwidth and accuracy requirements are dependent on the required accuracy and response of the system, but a rule of thumb is that the bandwidth of the compensating controller—i.e., the force feedback—should be at least 10 times faster than the desired bandwidth of the complete actuation system, and the sensors used in the compensating controller should have a resolution of at least 10 times the desired steady state accuracy of the controller. For example, in one application of this invention, the desired closed-loop bandwidth of the piston control was approximately 4 Hz, and empirical observation showed that system resonance due to nonlinear effects in chamber pressure caused undesirable system oscillations of about 1 Hz. Thus, a force-controller with a control bandwidth of better than 100 Hz provided sufficient response time to offset the inherent nonlinear dynamics of the piston. In this same application, the precision of the chamber pressure measurement was approximately 0.1 pound per square inch (psi), while the system operated with chamber pressures up to approximately 100 psi.

The above pneumatic control techniques may further be embodied in a triplex pneumatic architecture. In addition to providing desirable redundancy, a triplex pneumatic architecture system mitigates certain deficiencies associated with the above single-line systems 200, 300, such as the abrupt and immediate transition from autopilot to pilot control experienced with autopilot disengagement. An additional benefit of using a triplex pneumatic architecture system in the autopilot is that, by using three pneumatic actuation assemblies, a roller bearing based design is no longer required for yoke/joystick manipulation.

Figure 5A:
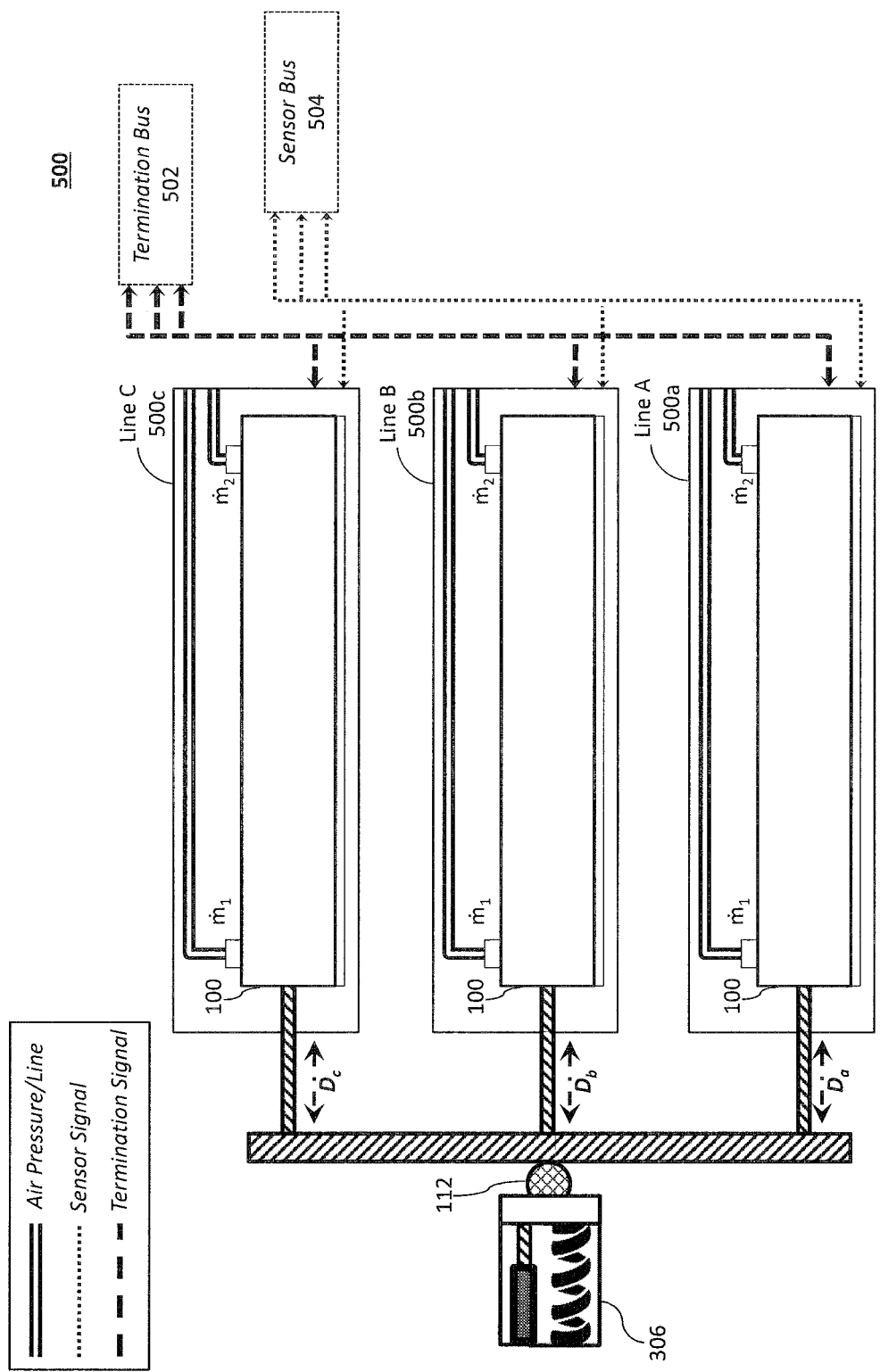
FIG. 5a is a schematic diagram of an example triplex pneumatic architecture system that employs three pneumatic subsystems.

FIG. 5a illustrates a schematic of an example triplex pneumatic architecture system 500 that employs three substantially similar or identical pneumatic subsystems 500a, 500b, 500c that operate in parallel, which are illustrated as pneumatic subsystem line A ("Line A") 500a, pneumatic subsystem line B ("Line B") 500b, and pneumatic subsystem line C ("Line C") 500c. As illustrated, each of the pneumatic subsystems 500a, 500b, 500c include a pneumatic actuation assembly 100 to perform the same task and may therefore be mechanically coupled to one other. The three pneumatic actuation assemblies 100 may further share a common load connector 112 at one or both ends (the back end load connector 112 is omitted from FIG. 5a to better illustrate the bus connections).

The pneumatic subsystems 500a, 500b, 500c are communicatively and operatively coupled to one another to facilitate exchange of feedback and instructions, such as sensor readings (e.g., current, pressure, speed, position, force, and other measurements) via a sensor bus 504 and termination signals via termination bus 502. In view of the triple redundancy of the triplex pneumatic architecture system 500, the three pneumatic actuation assemblies 100 receive like control commands (e.g., from a flight control system) via their respective pneumatic subsystems 500a, 500b, 500c.

Each of the pneumatic subsystems 500a, 500b, 500c includes a processor 202 to command a motor current from the servo driver 204 to the servo valve 212, which is monitored using an in-line current sensor 302. Each processor 202 monitors the measured motor current of all three lines. Absent a system failure, the measured motor current at each of the pneumatic subsystems 500a, 500b, 500c is expected to be substantially the same because the three pneumatic actuation assemblies 100 are configured to drive the a common (i.e., the same) load 306 to the same commanded position. As a result, the feedback from each pneumatic subsystem 500a, 500b, 500c should be substantially the same. To that end, each processor 202 runs a voting algorithm to ensure that all three motor currents agree (i.e., within a predetermined acceptable deviation of one another). The voting algorithm can be a version of the "Triple Modular Redundancy" algorithm.

In the event that the measured motor current at one of the three pneumatic subsystems 500a, 500b, 500c disagrees with the other two pneumatic subsystems 500a, 500b, 500c (i.e., falls outside the predetermined acceptable deviation—indicating a failed line/subsystem), a termination signal (e.g., a 5V DC high signal) can be sent to a relay 304 at the failed subassembly. In operation, the relays 304 keep the pneumatic dump valves 204 closed (maintaining pressure in the line) by providing power to the pneumatic dump valves 204 unless a termination signal is received by the relay from a processor 202. This relay 304 arrangement is advantageous because a processor 202 failure at one of the lines would not disable the entire triplex pneumatic architecture system 500. When a failure is detected by any subsystem 500a, 500b, 500c, the processor 202 at the detecting subsystem is configured to send a termination signal to a relay 304 of the failed pneumatic subsystem, thereby disabling (e.g., venting/dumping) the failed pneumatic subsystem. After which, the two remaining healthy pneumatic subsystems may then alter their operation to account for the lost pneumatic actuation assembly 100. The two remaining subsystems alter their control gains such that the dynamics and performance of the two-piston system closely match the normal operation of the three-piston system. The altered controller for two-piston operation can be designed and operated using the same methods to design the normally-operating system.

Figure 5B:
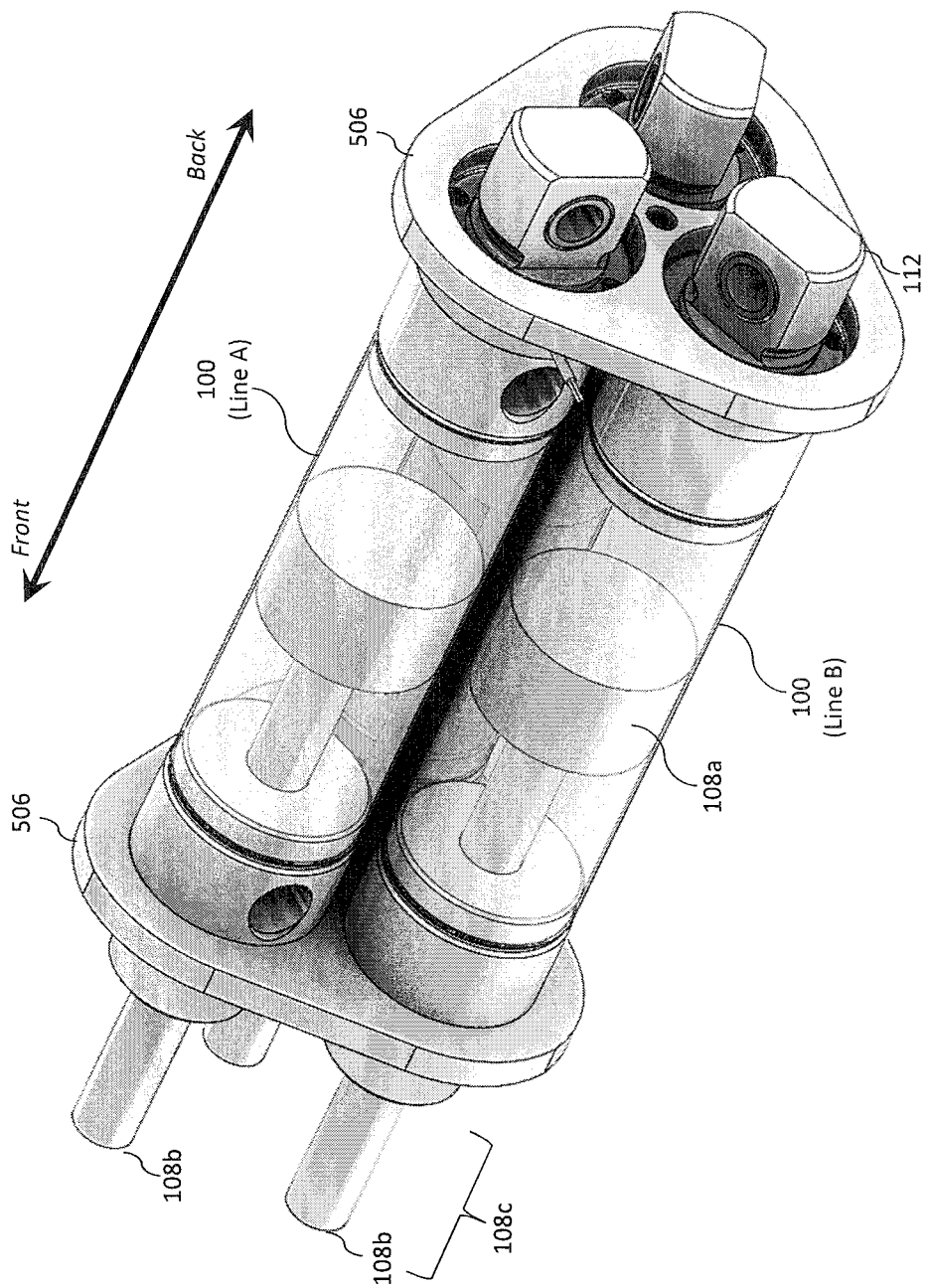
FIG. 5b illustrates a triplex-piston assembly embodying the triplex pneumatic architecture system.

FIG. 5b illustrates a triplex-piston assembly embodiment of the triplex pneumatic architecture system 500. As illustrated, the three pneumatic actuation assemblies 100 may be arranged in parallel and in a triangular configuration. The three pneumatic actuation assemblies 100 can be secured in place relative to one another using a set of bracket plates 506. As illustrated, each bracket plate 506 includes three bracket holes arranged in a triangular configuration. The outer perimeter of the bracket plate 506 may also be triangular. While the triplex-piston assembly is illustrated in a triangular configuration, other configurations are possible depending on the application. For example, the three pneumatic actuation assemblies 100 may be arranged in parallel and in a planar configuration (side-by-side in a single plane).

The three pneumatic actuation assemblies 100 of FIG. 5b are illustrated as employing three separate load connectors 112 at the back end, but the three pneumatic actuation assemblies 100 may be configured to share a common load connector 112 or to use the back end bracket plate 506 for attachment (e.g., to a fixed portion of the aerial vehicle). Load connectors 112 are not illustrated at the front end, but may likewise share a load connector 112 or employ three separate load connectors 112. In either case, the load connector(s) 112 may be coupled to the tail rod portion 108c of each pneumatic actuation assembly's 100 piston rod 108b.

Figure 6A:
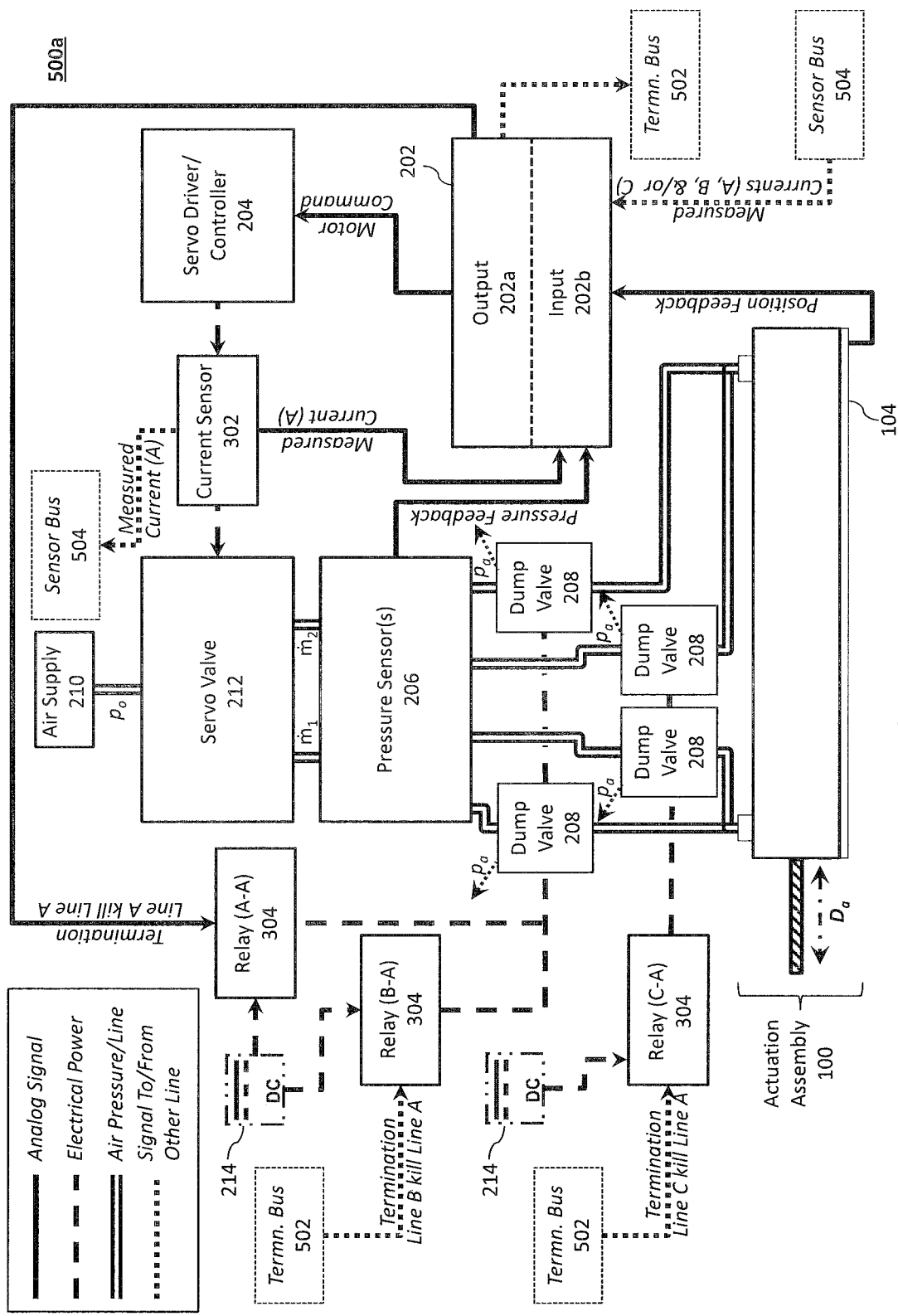
FIGS. 6a through 6c are schematic diagrams of each of the three pneumatic subsystems.
Figure 6B:
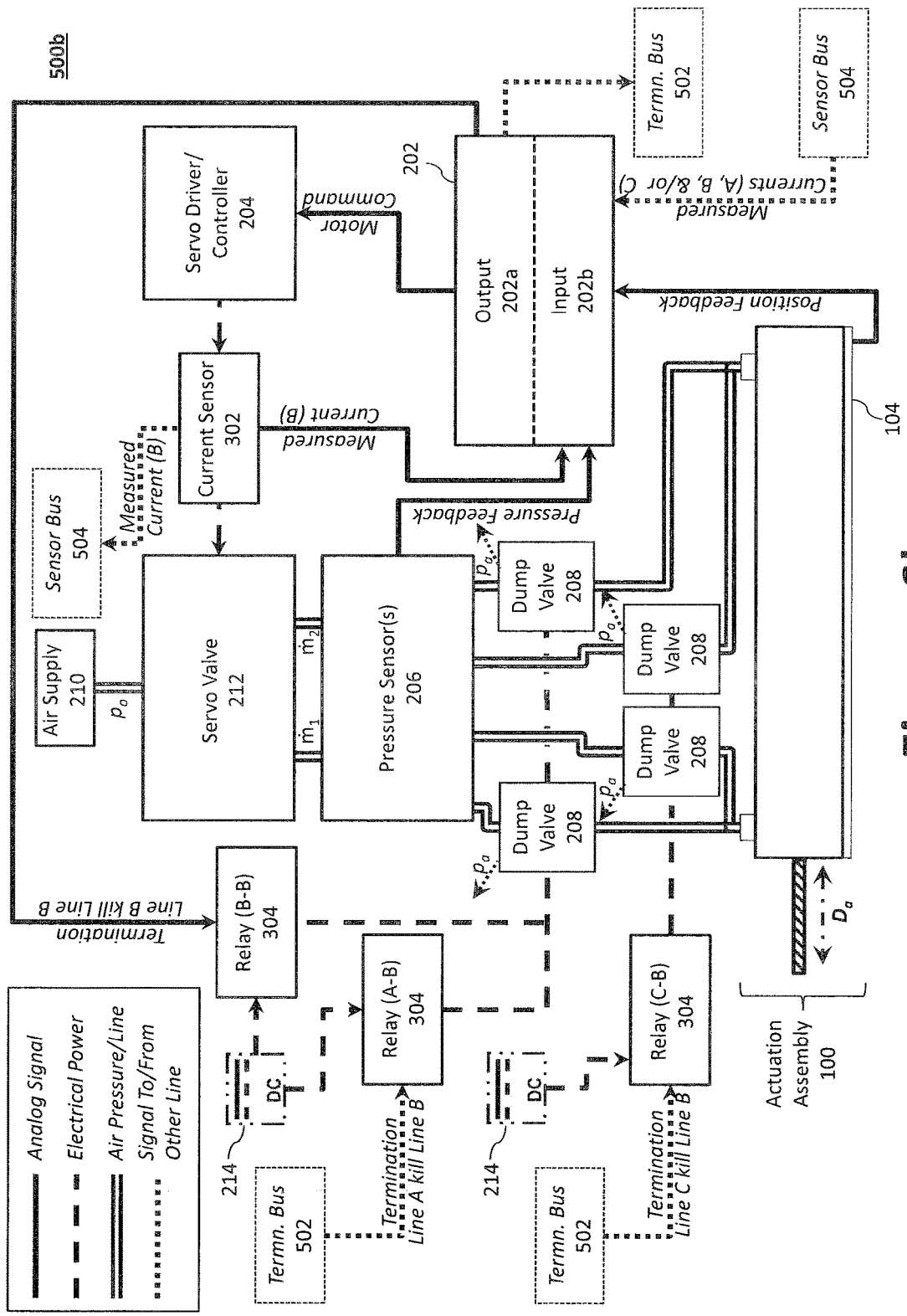
Figure 6C:
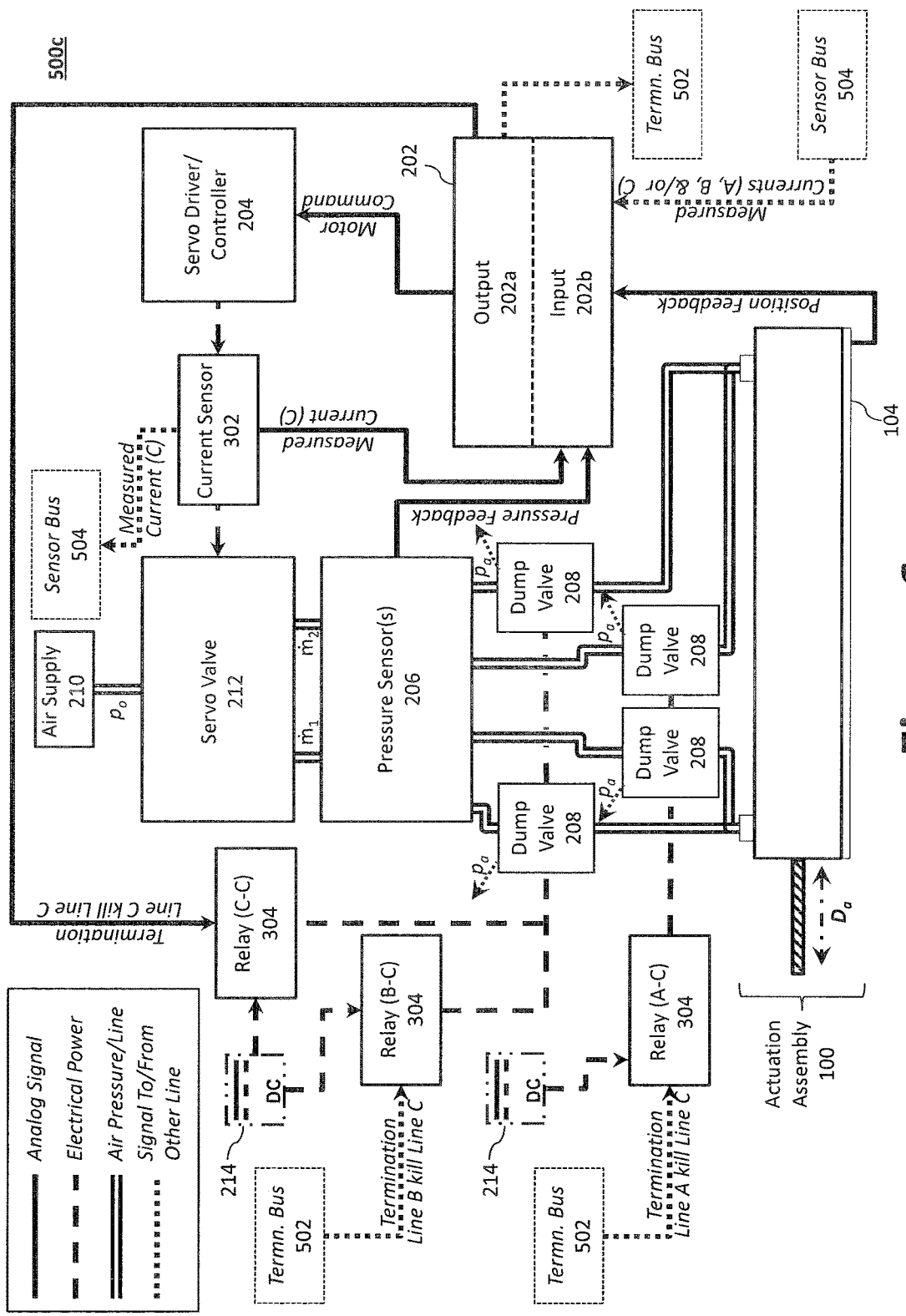

FIGS. 6a through 6c illustrate schematics for each of Line A 500a, Line B 500b, and Line C 500c. As noted above, the three pneumatic subsystems 500a, 500b, 500c are substantially the same and, therefore, only FIG. 6a will be discussed in detail. As can be appreciated, however, the discussions pertaining to FIG. 6a are equally applicable to FIGS. 6b-6c, but from the perspective of the other pneumatic subsystems 500a, 500b, 500c.

Turning now to FIG. 6a, a schematic of Line A 500a is illustrated, the various components of which may be modular components. As illustrated, Line A 500a generally comprises a pneumatic actuation assembly 100, a processor 202, a servo driver 204, one or more pressure sensors 206, a plurality of dump valves 208, an air supply 210, an electromechanical servo valve 212, a power supply 214, a plurality of relays 304, a current sensor 302, and one or more bus interfaces to couple with the termination bus 502 and the sensor bus 504. The one or more bus interfaces enable communication and feedback between the three pneumatic subsystems 500a, 500b, 500c via the termination bus 502 and the sensor bus 504. The bus interfaces employ one or more electrical connectors (e.g., multi pin connectors), hard wired, wireless transceivers, etc. In certain aspects, the triplex pneumatic architecture system 500 may employ a peer-to-peer communication network, or a master slave network. Example networks include a controller area network (CAN bus).

As illustrated, Line A 500a includes three relays 304, one relay (A-A) being controlled by termination signals from the processor 202 of Line A 500a, while the other two relays (B-A), (C-A) are controlled by termination signals from the processors 202 of Line B 500b and Line C 500c, respectively. As with the single-line CBIT pneumatic system 300, Line A 500a includes a current sensor 302 to measure the electrical motor current between the servo driver 204 and the servo valve 212. The current sensor 302 outputs the measurement data (i.e., a measured motor current) to the sensor bus 504 to be communicated to the processors 202 of all three lines (i.e., Line A 500a, Line B 500b, and/or Line C 500c) and/or, if desired, directly to the input circuitry 202b of the processor 202 of Line A 500a. In operation, similar feedback is expected from each of the lines. In other words, Line A's 500a sibling processors 202 (the processors 202 of Line B 500b and Line C 500c) are expected to command similar motor currents to their respective servo valves 212 because the three pneumatic actuation assemblies 100 drive the same load 306 to the same commanded position. Accordingly, each processor 202 of the three lines (Lines A, B, and C) is configured to monitor the other two lines. For example, Line A 500a can be terminated by the processors 202 of Line B 500b, and/or Line C 500c.

While the three lines (i.e., Line A 500a, Line B 500b, and Line C 500c) are each illustrated as having three relays 304, the pneumatic system 500 can still function reliably using only two relays 304 at each line 500a, 500b, 500c. With reference to Line A 500a, for example, it is not necessary that the processor 202 of Line A 500c be configured to terminate Line A 500c (i.e., self-terminate), to that end, relay (A-A) may be omitted, thereby leaving only relays (B-A), (C-A). Nevertheless, self-termination is contemplated and may be employed to provide additional redundancy via optional relays 304 (A-A), (B-B), and (C-C).

Accordingly, each processor 202 monitors the measured motor current of all three pneumatic actuation assemblies 100 to identify any discrepancies. Each processor 202 within the three pneumatic subsystems 500a, 500b, 500c may therefore run a voting algorithm to ensure that all three motor currents from each of the three current sensors 302 agree. In the event that one line's motor current disagrees with the other two sibling lines, a termination signal is sent to the disagreeing line's relay 304 via termination bus 502 to cut power to the dump valve 202, thereby dumping/venting pressure ($p_a$) in the single failed pneumatic system.

An unsafe failure within the pneumatic system 500 will result in a deviation of the motor current from a predetermined "normal" operating range. With the inclusion of pressure and/or force feedback, only the motor current measurement needs to be monitored to detect all critical pneumatic system failures. Accordingly, in addition to motor current feedback, the use of pressure and/or force feedback in the control loop of each individual pneumatic actuation assembly 100 enables the measurement of electrical motor current from the servo driver 204 to capture information about all components in each individual pneumatic subsystems 500a, 500b, 500c of the pneumatic system 500.

By way of illustration, consider a scenario without pressure compensation: all three pistons are mechanically coupled and one individual pneumatic actuation assembly 100 has lost an air hose to one of its chambers. Though all of the controllers might be affected by the loss of a piston, the output of each linear position sensor 106 would remain the same as the others. Relying solely on piston position, the voting algorithm would not be able to distinguish this change in system response to a change in the external load on the pistons. Through motor current monitoring, the pneumatic system 500 would detect a deviation in the motor current measurement at the current sensor 302 of the disconnected line relative to the measurements at the other two operable lines. Moreover, through pressure and/or force feedback via the one or more pressure sensors 206, the pneumatic system 500 could further detect, via one of the processors 202, a sudden drop in pressure at the failed line.

A listing of exemplary failure modes detected and addressed by the triplex architecture is provided at Table 1. Pressure feedback control, for example, may be used to detect the failures set forth at item numbers 3 and 4. With regard to item numbers 6 and 7, failure would be detected in response to motor current deviations once the pneumatic system 500 generates control actions. A failure under numbers 6 and 7 may not be detected immediately if the pneumatic actuation assembly 100 is under low load and static because the failure would result in zero motor current, which can be close to the expected motor current when under low load and static.

TABLE 1

| No. | Failed LRU | Failure Type | Failure Consequence | Detection Of Failure |
|---|---|---|---|---|
| 1 | Processor | Power Failure | The servo driver receives a command of 0 V and the piston will attempt to hard over. | The processors of the other two system/lines will detect the motor current deviation and will terminate the failed line. |
| 2 | Piston/Processor | Position Signal Loss | The processor outputs a maximum command to overcome a perceived position error and the piston will attempt to hard over. | One or more of the processors will detect the motor current deviation and will terminate the failed line. |
| 3 | Tubing/Fitting/Servo/Pressure Sensor | Pneumatic Line Rupture | The piston side opposite the piston side experiencing the pressure loss (the side with the rupture) will overpower the side with the pressure loss and the piston will attempt to hard over. | The large pressure change will be detected using pressure feedback to the piston controller. The large pressure change will result in the command from one line not matching the others, resulting in a detectable motor current deviation. |
| 4 | Pressure Sensor/Processor | Pressure Sensing Failure | The pressure feedback term of the controller will not function, leading to a degraded/unstable piston. | The incorrect pressure feedback term will lead to a deviation in command coming from one of the processor's and therefore a detectable motor current deviation. |
| 5 | Current Sensor/Processor | Current Signal Loss | The processors will be receiving a 0 V motor current reading from one of the three lines. | The incorrect motor current reading will cause a clear motor current deviation and the line with the failed sensor will be terminated. |
| 6 | Servo/Servo Controller | Servo Loss of Power | The servo will be driven to its center position and no air will be allowed to or from either side of the piston. | The servo motor current will not match the two functioning servos and the motor current deviation will cause the failed line to be terminated. |
| 7 | Servo/Servo Controller | Servo Incorrect Response to Command | The controller may become unstable or drive to a hard over condition. | The motor current going through the incorrect servo will cause a detectable motor current deviation and the failed line will be terminated. |

TABLE 1-continued

| No. | Failed LRU | Failure Type | Failure Consequence | Detection Of Failure |
|---|---|---|---|---|
| 8 | Processor | Loss of command from core | The processor with the incorrect commands will be fighting the other two lines to reach the position it was last command to go. | The opposing servo commands will result in a detectable motor current deviation and the termination of the failed line. |

As noted above, each processor 202 measures motor current of all three each pneumatic subsystems 500a, 500b, 500c to calculate the differences (delta error values: $E_{XY}$) between the motor current in each line: $E_{AB}$, $E_{AC}$, and $E_{BC}$. These error values may also be filtered to reduce noise. System failure is detected when the error values exceed or deviate from a predetermined allowable threshold or range. The predetermined allowable threshold value is selected to both detect failures quickly and reject discrepancies that do not result from failures (to avoid false positives). Examples of discrepancies that should be rejected include deviations that result from sensor noise, and deviations that result from small differences in each of the three pneumatic pistons. The selection of error threshold should consider the intrinsic noise and performance deviations of the chambers and the effect of component failures on the controller. The error threshold may be, for example, any deviation more than 5% of the total measurement range. The triplex voting logic, which is summarized in Table 2, employs the error values and the threshold of system failure to assess system health.

correctly determined that the current of Line C was significantly different from those of Line A and Line B.

Figure 7A:
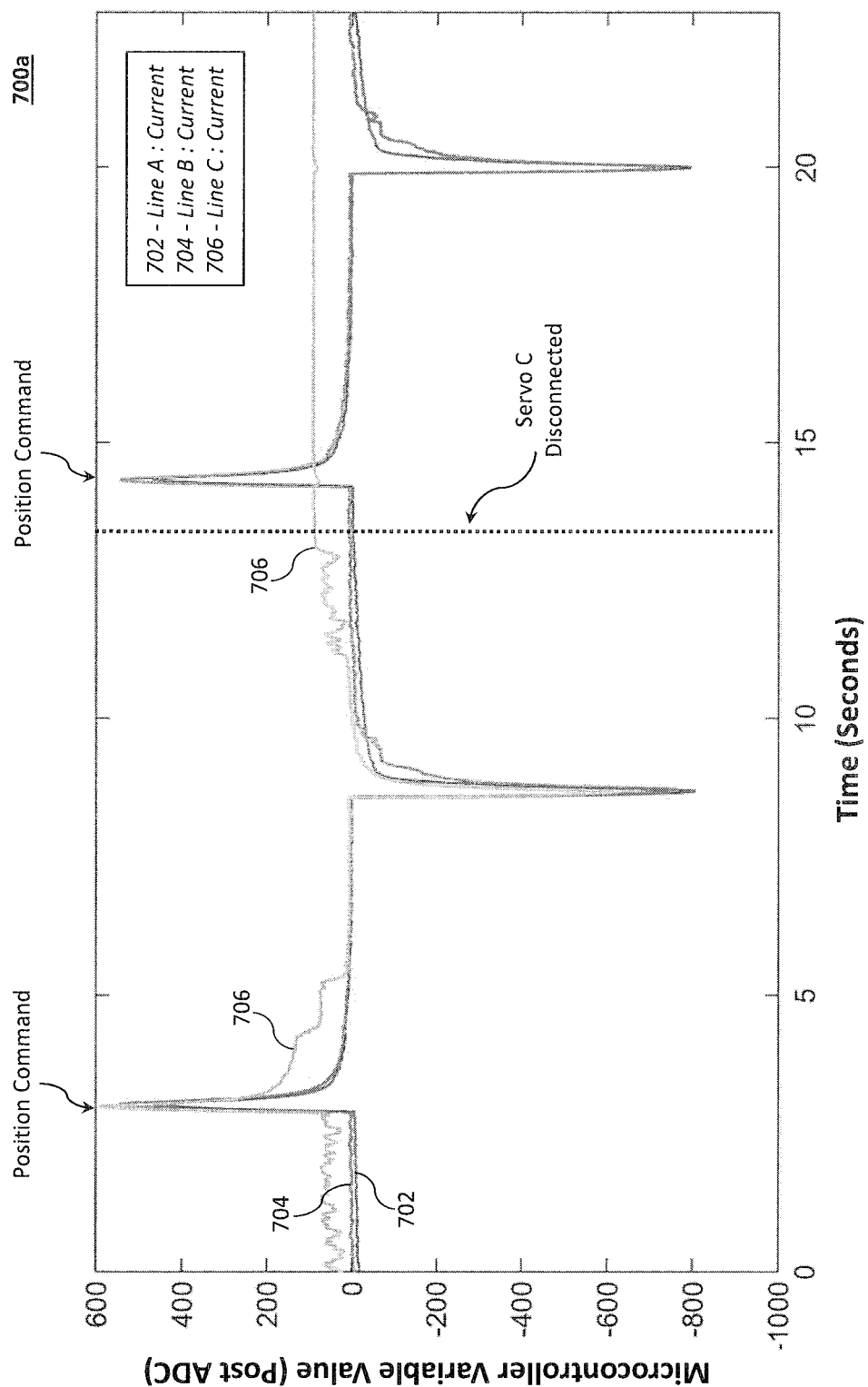
FIGS. 7a and 7b are graphs illustrating certain testing results of the triplex pneumatic architecture system.
Figure 7B:
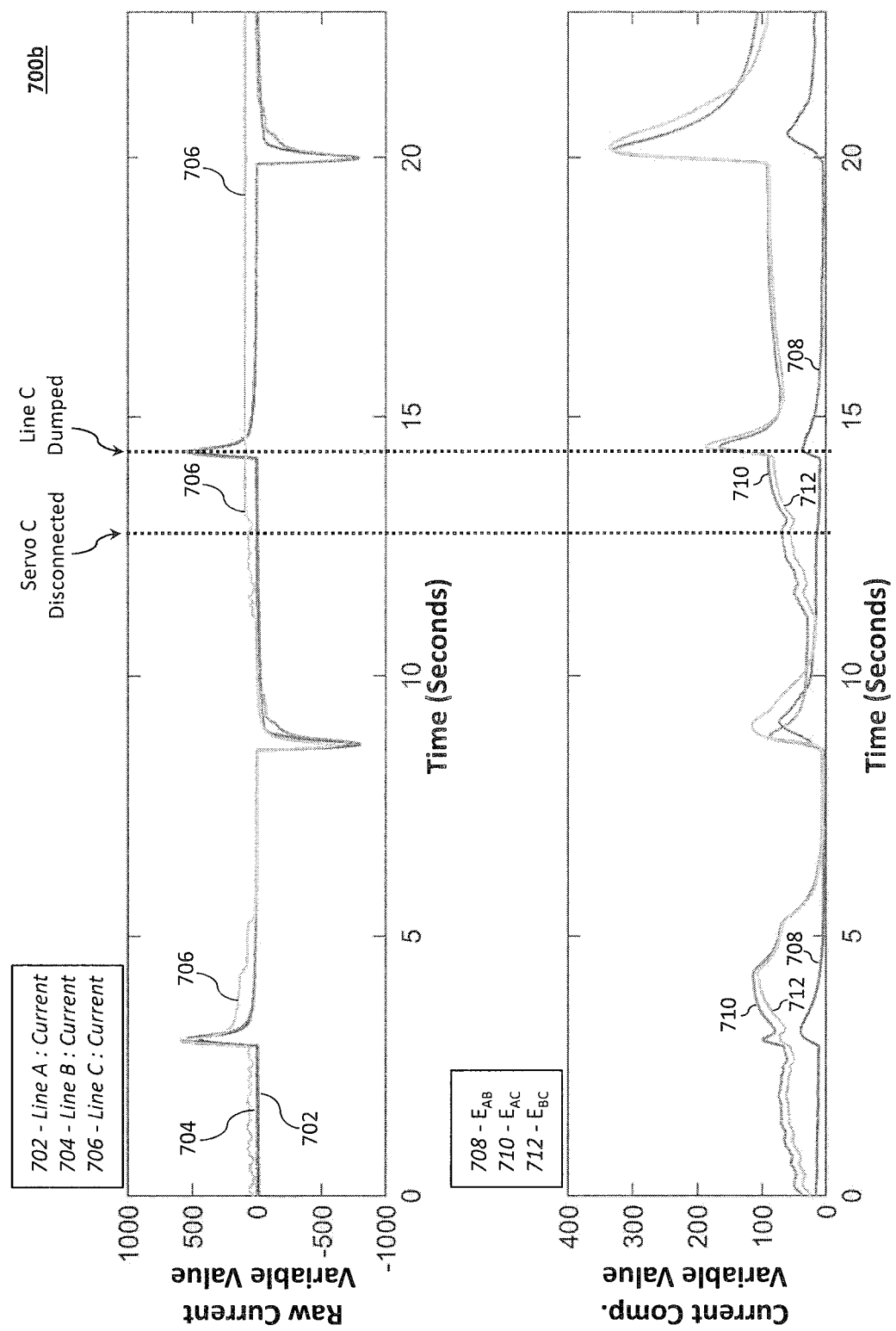

FIG. 7b is a graph illustrating the differences in the measured motor currents for the three pneumatic lines. As explained above, each processor 202 measures motor current of all three lines—Line A 500a, Line B 500b, and Line C 500c—and calculates the difference between motor current in each line: $E_{AB}$, $E_{AC}$, and $E_{BC}$. System failure is detected when the error values exceed an allowable threshold. A servo failure was again created by unplugging the servo on Line C. After a short delay (about 2 seconds), the failure was detected and Line C was automatically dumped. Specifically, error values $E_{AC}$, and $E_{BC}$ both exceeded the allowable deviation threshold, and $E_{AB}$ did not, which indicates that the line in common of the two failed measurements was the source of the failure.

The short delay in detection of the failure can be attributed to the nature of the generated failure. Specifically, when the servo is unplugged at Line C, it sends 0 motor current reading, which does not differ significantly from the healthy

TABLE 2

| | | | LEGEND | | | | |
|---|---|---|---|---|---|---|---|
| | | | Comparison is above threshold | | | 1 | |
| | | | Comparison is below threshold | | | 0 | |
| $E_{AB}$ | 0 | 1 | 0 | 0 | 1 | 1 | 0 |
| $E_{AC}$ | 0 | 0 | 1 | 0 | 1 | 0 | 1 |
| $E_{BC}$ | 0 | 0 | 0 | 1 | 0 | 1 | 1 |
| System Status | All Lines Operative | Current discrepancy indicative of a failed line. Track number of cycles. Generate alert indicating failed line. | | | Line A has failed. | Line B has failed. | Line C has failed. |

A series of experiments were performed to validate the effectiveness of the triplex pneumatic architecture system 500 and triplex voting logic in identifying line failures. The results are summarized in FIGS. 7a and 7b.

FIG. 7a is a graph illustrating the measured motor current in three pneumatic lines. Each pneumatic line was tracked implementing like (e.g., the same) step position commands. The current data is presented in "microcontroller units," which is the unscaled output of the analog-to-digital converter of the microcontroller used to acquire the data. A servo failure was created on Line C by unplugging the servo valve. To introduce real-world discrepancies to the experiment, the piston and mechanical assembly used in-line C were not identical to those of Line A and Line B. Despite these differences, the CBIT algorithm of the triplex pneumatic architecture system 500 ignored these normal discrepancies, while still successfully detecting an actual system failure. As evidenced by the graph, the motor current measured at Line C after servo failure was nonresponsive to the subsequently received position commands (indicated by the current spikes/peaks in the graph). Therefore, the CBIT algorithm of the triplex pneumatic architecture system 500 lines under no load and without a position command. When a new position command is received (thereby requiring motor current at each line), the healthy lines (Lines A and B) generate a new non-zero motor current and the failure of Line C is immediately detected as being differentiated.

Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the invention may therefore be practiced otherwise than as specifically described above. The above-cited patents and patent publications are hereby incorporated by reference in their entirety.

What is claimed is:

1. A triplex pneumatic architecture system comprising:
a first pneumatic subsystem to control movement of a first piston in a first pneumatic actuation assembly, the first pneumatic subsystem comprising a first servo driver, a first servo valve, a first current sensor, a first dump valve coupled to a first relay, a first position sensor, and a first processor to communicate a first control command to the first servo driver, wherein the first servo driver transmits a control current to the first servo valve to selectively actuate the first pneumatic actuation assembly in response to the first control command, wherein the first position sensor is configured to measure linear movement of the first piston and to provide position feedback of the first piston, wherein the first current sensor is configured to measure the control current and to output a first measured current value, and wherein the first processor is configured to generate a termination signal to actuate the first relay and open the first dump valve;

a second pneumatic subsystem to control movement of a second piston in a second pneumatic actuation assembly, the second pneumatic subsystem comprising a second servo driver, a second servo valve, a second current sensor, a second dump valve coupled to a second relay, a second position sensor, and a second processor to communicate a second control command to the second servo driver, wherein the second servo driver transmits a control current to the second servo valve to selectively actuate the second pneumatic actuation assembly in response to the second control command, wherein the second position sensor is configured to measure linear movement of the second piston and to provide position feedback of the second piston, wherein the second current sensor is configured to measure the control current and to output a second measured current value, and wherein the second processor is configured to generate a termination signal to actuate the second relay and open the second dump valve;

a third pneumatic subsystem to control movement of a third piston in a third pneumatic actuation assembly, the third pneumatic subsystem comprising a third servo driver, a third servo valve, a third current sensor, a third dump valve coupled to a third relay, a third position sensor, and a third processor to communicate a third control command to the third servo driver, wherein the third servo driver transmits a control current to the third servo valve to selectively actuate the third pneumatic actuation assembly in response to the third control command, wherein the third position sensor is configured to measure linear movement of the third piston and to provide position feedback of the third piston, wherein the third current sensor is configured to measure the control current and to output a third measured current value, and wherein the third processor is configured to generate a termination signal to actuate the third relay and open the third dump valve; and a communication bus to communicatively couple each of the first processor, the second processor, and the third processor, wherein the first processor is configured to receive each of the first measured current value, the second measured current value, and the third measured current value via the communication bus, wherein the second processor is configured to receive each of the first measured current value, the second measured current value, and the third measured current value via the communication bus, wherein the third processor is configured to receive each of the first measured current value, the second measured current value, and the third measured current value via the communication bus, wherein each of the second processor and the third processor is configured to generate the termination signal and to communicate the termination signal to the first relay when the first measured current value deviates from the second and third measured current values by a predetermined error value, and wherein the first relay is configured to open the first dump valve to vent the first pneumatic actuation assembly upon receipt of the termination signal.

2. The triplex pneumatic architecture system of claim 1, wherein each of said first, second, and third pneumatic subsystems includes a set of dump valves.

3. The triplex pneumatic architecture system of claim 2, wherein a first one of said set of dump valves vents a first portion of a pneumatic cylinder and a second one of said set of dump valves vents a second portion of a pneumatic cylinder.

4. The triplex pneumatic architecture system of claim 3, wherein the set of dump valves are controlled by a common relay.

5. The triplex pneumatic architecture system of claim 1, wherein the first, second, and third pneumatic actuation assemblies are coupled to a common load.

6. The triplex pneumatic architecture system of claim 1, wherein each of the second processor and the third processor is configured to communicate the termination signal to the first relay over the communication bus.

7. The triplex pneumatic architecture system of claim 1, wherein the predetermined error value is calculated by determining a difference between each of the first, second, and third measured current values.

8. The triplex pneumatic architecture system of claim 1, wherein each of said first, second, and third pneumatic subsystems includes a pressure sensor to provide real-time pressure feedback to each of the first, second, and third processors.

9. The triplex pneumatic architecture system of claim 1, wherein each of said first, second, and third pneumatic subsystems includes two relays.

10. The triplex pneumatic architecture system of claim 9, wherein each of said three relays is configured to receive a termination signal from a different one of said first, second, and third pneumatic subsystems.

11. The triplex pneumatic architecture system of claim 10, wherein each of said three relays is configured to control a different dump valve to vent pressure from a common air supply line.

12. The triplex pneumatic architecture system of claim 5, wherein the common load is a flight control of an aerial vehicle.

13. The triplex pneumatic architecture system of claim 12, wherein the first, second, and third control commands are like commands from a flight control system of the aerial vehicle.

14. The triplex pneumatic architecture system of claim 1, wherein each of the first processor, the second processor, and the third processor is configured to determine when the first measured current value deviates from the second and third measured current values using a majority vote algorithm.

15. A triplex pneumatic architecture system comprising:
a first pneumatic subsystem to control a first pneumatic actuation assembly, the first pneumatic subsystem comprising a first current sensor to measure a control current from a first servo driver to a first servo valve to output a first measured current value, and a first dump valve coupled to a first relay, wherein a first processor is configured to generate a termination signal to actuate the first relay to open the first dump valve;

a second pneumatic subsystem to control a second pneumatic actuation assembly, the second pneumatic subsystem comprising a second current sensor to measure a control current from a second servo driver to a second servo valve to output a second measured current value, and a second dump valve coupled to a second relay, wherein a second processor is configured to generate a termination signal to actuate the second relay to open the second dump valve;

a third pneumatic subsystem to control a third pneumatic actuation assembly, the third pneumatic subsystem comprising a third current sensor to measure a control current from a third servo driver to a third servo valve to output a third measured current value, and a third dump valve coupled to a third relay, wherein a third processor is configured to generate a termination signal to actuate the third relay to open the third dump valve; and a communication bus to communicatively couple each of the first, second, and third pneumatic subsystems, wherein each of the first processor, the second processor, and the third processor is configured to generate the termination signal and to communicate the termination signal to the first relay when the first measured current value deviates from the second and third measured current values by a predetermined error value.

16. The triplex pneumatic architecture system of claim 15, wherein the first, second, and third pneumatic actuation assemblies are coupled to a common load.

17. The triplex pneumatic architecture system of claim 16, wherein the common load is a flight control of an aerial vehicle.

18. The triplex pneumatic architecture system of claim 15, wherein each of the first processor, the second processor, and the third processor is configured to determine when the first measured current value deviates from the second and third measured current values using a majority vote algorithm.

19. A pneumatic architecture system comprising:

a pneumatic subsystem to control a pneumatic actuation assembly, wherein the pneumatic actuation assembly includes a cylinder and a piston, wherein the piston divides an internal area of the cylinder into a first area having a first pressure and a second area having a second pressure;

a servo driver to generate a control current based at least in part on a control command from a processor;

a servo valve to selectively actuate the pneumatic actuation assembly by selectively adjusting the first pressure and the second pressure in response to the control current;

one or more pressure sensors to provide to the processor pressure data reflecting the first pressure and the second pressure, wherein the processor is configured to perform real-time total force feedback based at least in part on the pressure data; and a first dump valve and a second dump valve, the first dump valve being fluidly positioned in-line between the servo valve and the first area and the second dump valve being fluidly positioned in-line between the servo valve and the second area.

20. The pneumatic architecture system of claim 19, wherein the total force is calculated as a function of the pressure data and the piston's surface area.

21. The pneumatic architecture system of claim 19, wherein the pneumatic architecture system is coupled to a second pneumatic architecture system and a third pneumatic architecture system to provide a triplex pneumatic architecture system.

22. The pneumatic architecture system of claim 15, wherein the predetermined error value is calculated by determining a difference between each of the first, second, and third measured current values.

* * * * *